(12) United States Patent
Wilcox et al.

(10) Patent No.: US 9,771,178 B2
(45) Date of Patent: Sep. 26, 2017

(54) FLEX ASSEMBLY OF PALLET BASE AND DECK

(71) Applicant: A.R. Arena Products, Inc., Rochester, NY (US)

(72) Inventors: Donald E. Wilcox, Rochester, NY (US); Charles S. Arena, Rochester, NY (US)

(73) Assignee: A.R. ARENA PRODUCTS, INC., Rochester, NY (US)

(*) Notice: Subject to any disclaimer, the term of this patent is extended or adjusted under 35 U.S.C. 154(b) by 90 days.

(21) Appl. No.: 14/530,281

(22) Filed: Oct. 31, 2014

(65) Prior Publication Data

US 2015/0147112 A1    May 28, 2015

Related U.S. Application Data

(63) Continuation of application No. 13/810,119, filed as application No. PCT/US2011/001225 on Jul. 13, 2011, now abandoned.
(Continued)

(51) Int. Cl.
*B65D 19/00* (2006.01)
*B65D 6/16* (2006.01)
(Continued)

(52) U.S. Cl.
CPC .......... *B65D 19/0012* (2013.01); *B29C 65/58* (2013.01); *B65D 7/24* (2013.01);
(Continued)

(58) Field of Classification Search
CPC  B65D 19/0012; B65D 19/38; B65D 19/0004; B65D 9/12; B65D 7/24; B65D 2519/00572; B65D 2519/00318; B65D 2519/00288; B65D 2519/00562; B65D 2519/00293; B65D 2519/00323;
(Continued)

(56) References Cited

U.S. PATENT DOCUMENTS 3,398,849 A * 8/1968 Eastwood .............. B65D 19/16
217/15
3,413,752 A    12/1968 Perry
(Continued)

FOREIGN PATENT DOCUMENTS

CN    2226574    5/1996
CN    2283381    6/1998
(Continued)

OTHER PUBLICATIONS

Binder Clip, http://en.wikipedia.org/wiki/Binder_clip, printed May 26, 2015.
(Continued)

*Primary Examiner* — James Ference
(74) *Attorney, Agent, or Firm* — Bond Schoeneck & King PLLC; Jeffrey Powers

(57) ABSTRACT

Resin pallets having a deck and a base, where the deck and base are joined by an interlock, which is optionally reversible, are described. Methods of making such pallets by assembling the pallets by interlocking parts to form the pallets, in an optionally reversible method, are also described.

25 Claims, 17 Drawing Sheets

Related U.S. Application Data

(60) Provisional application No. 61/363,950, filed on Jul. 13, 2010.

(51) Int. Cl.
*B29C 65/58* (2006.01)
*B65D 19/38* (2006.01)

(52) U.S. Cl.
CPC ............ *B65D 9/12* (2013.01); *B65D 19/0004* (2013.01); *B65D 19/38* (2013.01); *B65D 2519/00024* (2013.01); *B65D 2519/00029* (2013.01); *B65D 2519/00034* (2013.01); *B65D 2519/00059* (2013.01); *B65D 2519/00064* (2013.01); *B65D 2519/00069* (2013.01); *B65D 2519/00273* (2013.01); *B65D 2519/00288* (2013.01); *B65D 2519/00293* (2013.01); *B65D 2519/00318* (2013.01); *B65D 2519/00323* (2013.01); *B65D 2519/00343* (2013.01); *B65D 2519/00562* (2013.01); *B65D 2519/00567* (2013.01); *B65D 2519/00572* (2013.01); *B65D 2519/00985* (2013.01); *Y10T 29/4987* (2015.01); *Y10T 29/49824* (2015.01); *Y10T 29/49876* (2015.01); *Y10T 403/54* (2015.01)

(58) Field of Classification Search
CPC ............ B65D 2519/00024; B65D 2519/00064; B65D 2519/00029; B65D 2519/00069; B65D 2519/00985; B65D 2519/00343; B65D 2519/00273; B65D 2519/00567; B65D 2519/00034; B65D 2519/00059; B29C 65/58; Y10T 403/54; Y10T 29/4987; Y10T 29/49824; Y10T 29/49876
See application file for complete search history.

(56) References Cited

U.S. PATENT DOCUMENTS

| | | | |
|---|---|---|---|
| 3,747,794 A * | 7/1973 | Bitney | B65D 19/16 217/15 |
| 3,824,933 A | 7/1974 | Lind | |
| 3,835,792 A | 9/1974 | Wharton | |
| 4,148,407 A * | 4/1979 | Sinclair | B65D 9/12 217/15 |
| 4,159,681 A | 7/1979 | Vandament | |
| 4,198,034 A | 4/1980 | Svirklys | |
| 4,597,338 A | 7/1986 | Kreeger | |
| 4,635,562 A | 1/1987 | Kreeger | |
| 4,775,068 A * | 10/1988 | Reiland | B65D 19/18 220/1.5 |
| 4,906,510 A * | 3/1990 | Todor, Jr. | B29C 53/06 108/51.3 |
| 4,911,084 A * | 3/1990 | Sato | B65D 19/38 108/55.1 |
| 5,042,396 A | 8/1991 | Shuert | |
| D346,681 S | 5/1994 | Pigott et al. | |
| 5,333,555 A | 8/1994 | McPhee | |
| 5,404,829 A * | 4/1995 | Shuert | B65D 19/0022 108/57.26 |
| 5,417,167 A | 5/1995 | Sadr | |
| 5,497,709 A | 3/1996 | Gonzalez et al. | |
| 5,579,686 A * | 12/1996 | Pigott | B65D 19/0012 108/56.1 |
| 5,676,067 A | 10/1997 | Breindel | |
| 5,791,261 A | 8/1998 | John et al. | |
| 5,809,905 A * | 9/1998 | John | B65D 19/0018 108/56.1 |
| 5,829,595 A * | 11/1998 | Brown | B65D 19/0018 206/386 |
| 5,860,369 A | 1/1999 | John et al. | |
| 5,870,958 A * | 2/1999 | Suzuki | B65D 19/0069 108/51.11 |
| 5,938,059 A * | 8/1999 | Luburic | B65D 11/1833 220/4.32 |
| 6,029,583 A | 2/2000 | LeTrudet | |
| 6,109,190 A | 8/2000 | Hale et al. | |
| 6,199,487 B1 * | 3/2001 | Coddington | B65D 19/0016 108/53.1 |
| 6,263,807 B1 * | 7/2001 | Fox | B65D 19/0073 108/54.1 |
| 6,317,981 B1 | 11/2001 | Clive-Smith | |
| 6,354,228 B1 | 3/2002 | McPhee et al. | |
| 6,622,641 B2 | 9/2003 | Smyers | |
| 6,840,181 B2 | 1/2005 | Smyers | |
| 7,007,815 B2 | 3/2006 | Anderson et al. | |
| 7,438,623 B2 | 10/2008 | Lin | |
| 2004/0007164 A1 * | 1/2004 | Herring | B65D 19/0018 108/51.11 |
| 2005/0061210 A1 * | 3/2005 | Wullenweber | B65D 19/0065 108/56.1 |
| 2005/0160949 A1 * | 7/2005 | Greene | B65D 19/0069 108/56.1 |
| 2005/0193927 A1 * | 9/2005 | Herring | B65D 19/0018 108/51.3 |
| 2005/0263044 A1 * | 12/2005 | Bearse | B29C 44/569 108/57.25 |
| 2006/0032413 A1 * | 2/2006 | Ogburn | B65D 19/0012 108/57.25 |
| 2006/0254476 A1 | 11/2006 | MacDonald et al. | |
| 2007/0006782 A1 * | 1/2007 | Creighton | B65D 19/0026 108/51.11 |
| 2007/0028813 A1 * | 2/2007 | Hassell | B65D 19/004 108/51.11 |
| 2010/0050910 A1 * | 3/2010 | Durco | B65D 19/0012 108/57.31 |
| 2010/0101974 A1 * | 4/2010 | Eskenazi | B65D 25/101 206/591 |
| 2012/0037050 A1 | 2/2012 | Nevo et al. | |

FOREIGN PATENT DOCUMENTS

| | | |
|---|---|---|
| CN | 2478937 | 2/2002 |
| CN | 1861485 | 11/2006 |
| CN | 2844026 | 12/2006 |
| DE | 2229243 | 12/1973 |
| JP | 51-24695 | 6/1976 |
| JP | 53-26763 | 7/1978 |
| JP | H10-230937 A | 9/1998 |
| KR | 20-0295654 | 11/2002 |

OTHER PUBLICATIONS

Core plug, http://en.wikipedia.org/wiki/Core_plug, printed May 26, 2015.

* cited by examiner

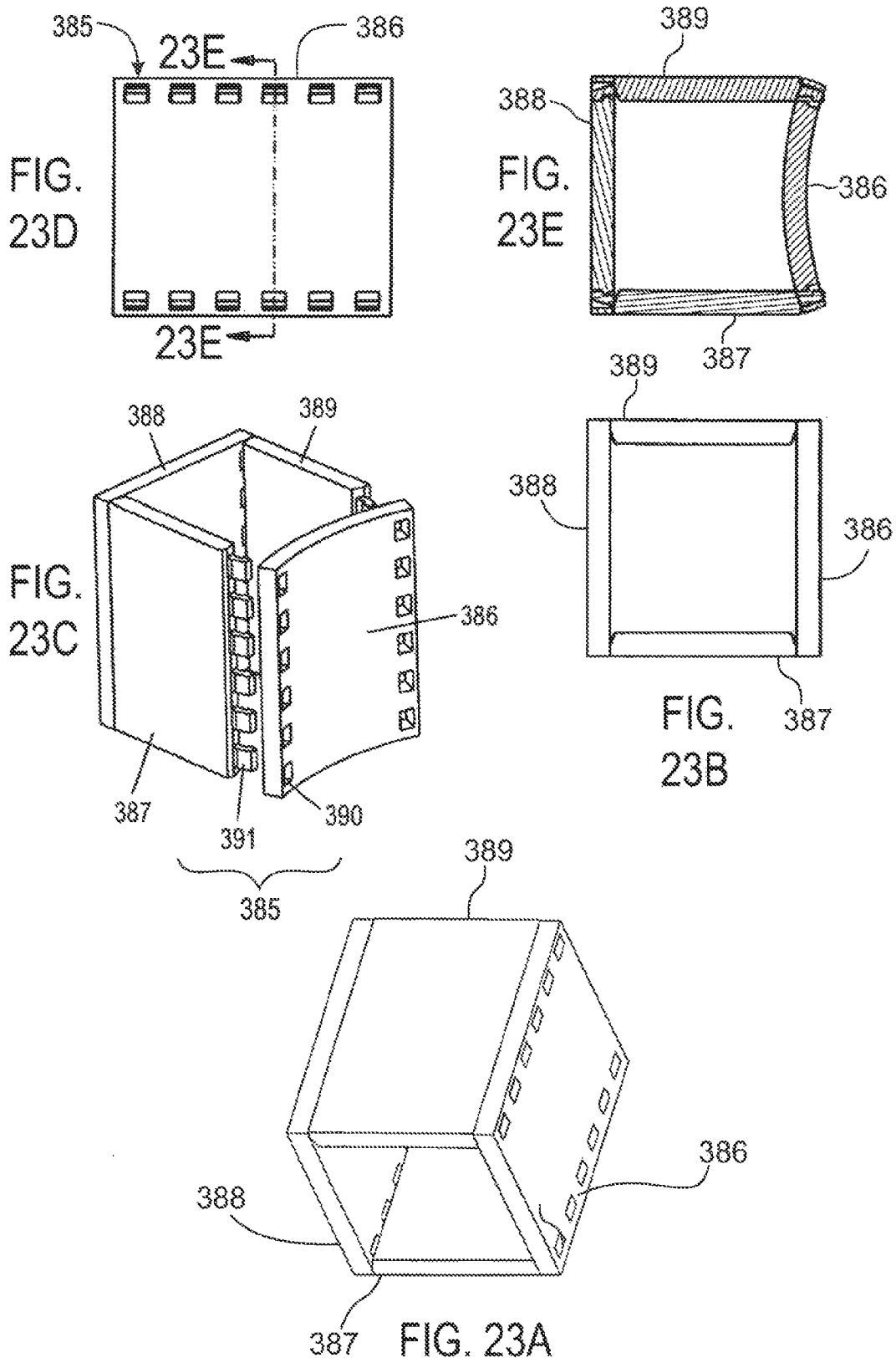

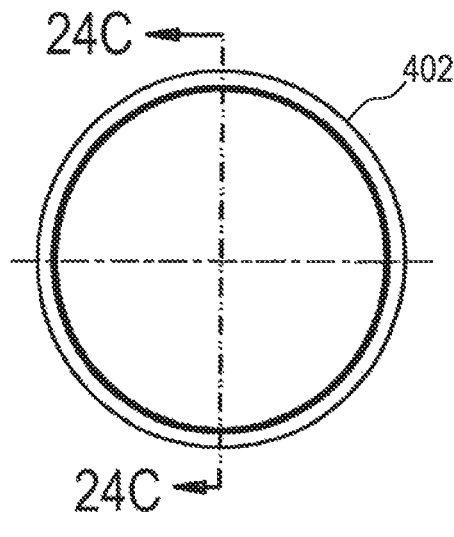
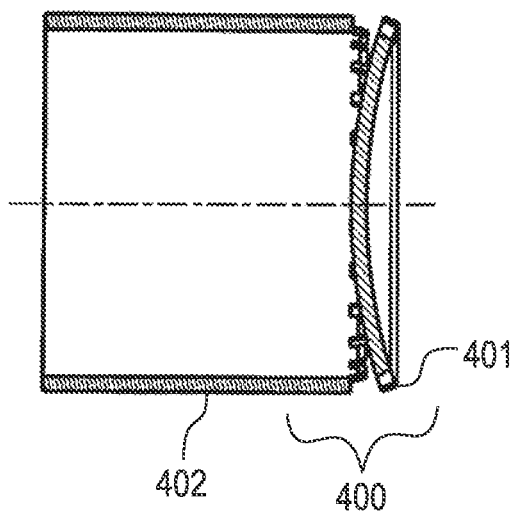
FIG. 24B    FIG. 24C
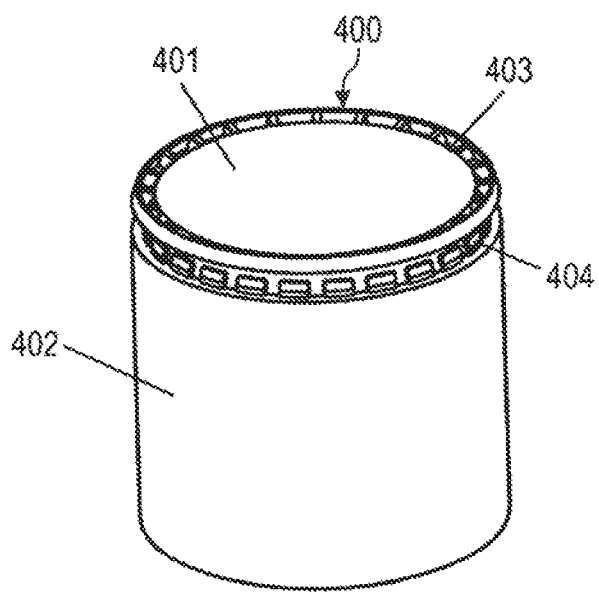
FIG. 24A

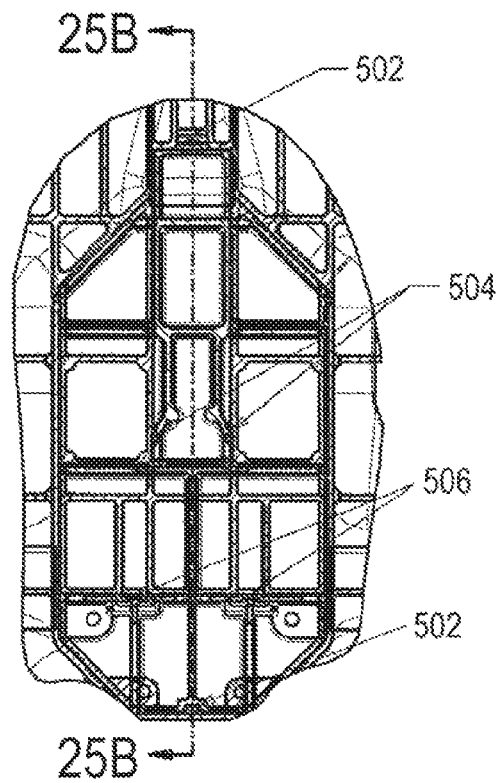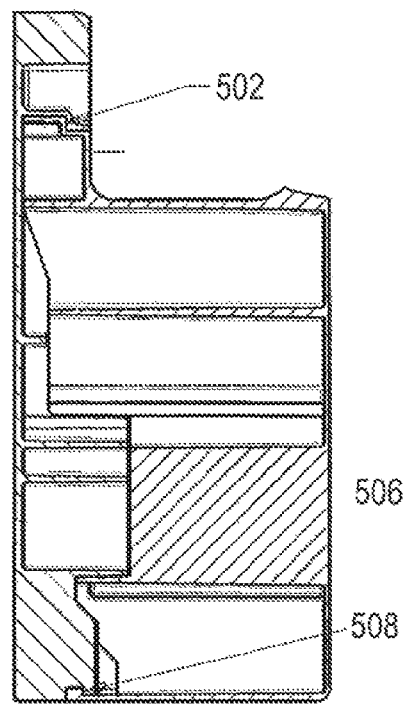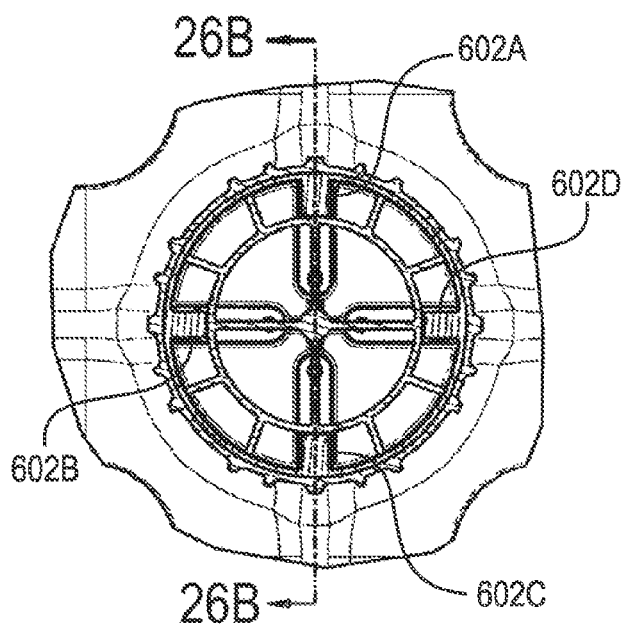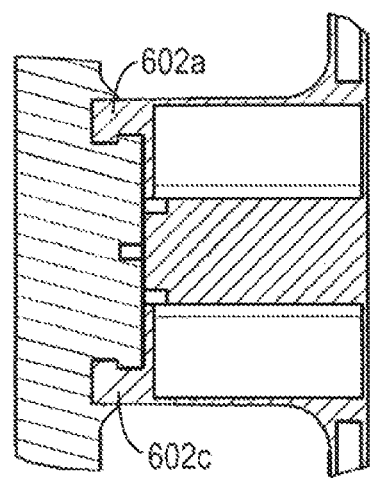
FIG. 25A
FIG. 25B
FIG. 26A
FIG. 26B

FLEX ASSEMBLY OF PALLET BASE AND DECK

CROSS-REFERENCE TO RELATED APPLICATIONS

This application is a continuation of application Ser. No. 13/810,119, having a filing date of Jul. 13, 2011, which application is the U.S. national stage application pursuant to 35 U.S.C. §371 of International Application No. PCT/US11/001225, filed Jul. 13, 2011, which was published in English, said international application claims the benefit under 35 U.S.C. §119(e) of U.S. Provisional Application No. 61/363,950, filed Jul. 13, 2010, all of which applications are hereby incorporated herein by reference in their entireties.

TECHNICAL FIELD

Pallets and methods of making such pallets by flex assembling the pallets using interlocking parts to form the pallets are described.

BACKGROUND

Many suggestions have been made for improvements to molded resin pallets, which supposedly offer advantages over wooden pallets. In the marketplace, however, wooden pallets still dominate, and molded plastic pallets have found it difficult to compete.

One suggestion identified in the prior art of resin pallets is to mold a top or deck separately from a molded bottom or base and then interconnect the two parts. Examples of this include U.S. Pat. Nos. 6,029,583; 3,835,792; 5,417,167; and 6,622,641. Two other U.S. Pat. Nos. 6,354,228 and 5,333,555, suggest bowing of boards or slats to fit into pallet stringers. The interconnections proposed by such patents have proven to be weak and easily broken or to involve extra fasteners such as screws or glue, which raise manufacturing expense and cause other problems. Pallet parts have also been welded together, but this has not proved satisfactory. Problems have included the weldability of the materials involved, the difficulty of creating secure welds over large areas to be joined and the inability to disassemble them for cleaning.

Various strengthening inserts, such as steel rods or strips, glass or carbon fibers, and other materials, have been incorporated into resin pallets to increase their strength. The use of these materials generally results in higher costs than the marketplace will bear, and also experience problems in pallet durability.

Exemplary embodiments described herein overcome these deficiencies. Certain embodiments especially provide multi-piece molded resin pallets and containers that are ruggedly interlocked, durable, and able to withstand abuses such as occur with forklifts and pallet jacks. Exemplary embodiments also reduce the expense of molded resin pallets while increasing their durability, so that molded pallets can compete successfully with wooden pallets.

SUMMARY

Flex assembly is a method of securely assembling and disassembling two or more bodies, comprising male and female inflexible locking features that interfere in their normal state by:

1. Flexing one or more of the bodies so that at least one of their locking features is rotated through an angle opposite the direction experienced in normal use and such that the interference with its mating feature is eliminated.
2. Engaging the locking features of the bodies.
3. Relaxing the flexing motion while maintaining engagement of the locking features.
4. Optionally, disassembling by reversing this process.

Exemplary embodiments provide interlocks and interlocking methods that securely attach a pallet deck of a molded resin, or other suitable material, to a pallet base of molded resin, or other suitable material, without fasteners or glue while providing a stronger and more robust interlock than has previously been achieved. The improved interlock is also able to be assembled automatically, and to be disassembled when necessary to clean and/or replace parts or make repairs.

The interlock includes positive male members and female members that are not inherently flexible, but are connected by flexible spans that can be bent or curved to enable the interlocks to be assembled. Bending or cambering the spans between the interlocks changes their separation distance and enables the male members or projections and female members to interlock in a way that becomes positive when the bending force is removed and the parts relax toward their original molded configuration. The bending or cambering of the flexible spans to accomplish the interlocks is preferably opposite to the effect of load forces normally applied to a pallet. Load forces on a pallet supported on its edges tend to make the pallet sag. In contrast to this, the bending or cambering movement that enables the interlocks to be formed is an arching or doming movement preferably opposite to the sagging tendency produced by load force on the pallet. This results in the forces normally encountered by a pallet being unable to loosen or damage the positive interlocks. This makes pallets interlocked according to exemplary embodiments stronger and more robustly resistant to various accidents and abuses that pallets suffer.

An exemplary embodiment of an interlock for joining bodies comprises (a) a first body including a plurality of first projections, at least two first projections including at least one first interlocking member; and (b) a second body including: (i) a plurality of second interlocking members located within the second body for receiving a respective first interlocking member, or (ii) a plurality of second projections, at least two of the second projections including at least one second interlocking member for receiving a respective first interlocking member; wherein: each first interlocking member is positioned to engage with a corresponding second interlocking member when the first and second bodies are interlocked, and wherein at least one of the first body and the second body's flexibility permits tilting outward a distal portion of the second body including the second interlocking member and tilting inward a distal portion of the first projection including the first interlocking member so that a plurality of first interlocking members engage a plurality of corresponding second interlocking members on opposing sides of the first and second bodies.

In a further embodiment, one of the first and second bodies is a base of a pallet and the other is a deck of a pallet.

Another exemplary embodiment provides a method of interlocking bodies having interlocks to form a pallet comprising: (a) providing: (i) a first body including a plurality of first projections, at least two of the first projections including at least one first interlocking member; and (ii) a second body including a plurality of second projections, at least two of the second projections including at least one second interlocking member for receiving a respective first interlocking member; wherein: each second projection is positioned to engage with a corresponding first projection when the first and second bodies are interlocked, and at least one of the first body and the second body has flexibility permitting at least one of tilting outward a distal portion of the second projection including the second interlocking member and tilting inward a distal portion of the first projection including the first interlocking member so that a plurality of first interlocking members engage a plurality of corresponding second interlocking members on opposing sides of the first and second bodies, (b) flexing a bendable portion of at least one of the first body and the second body by applying force against the body to flex the body, wherein at least one of the first body and the second body tilts outward a distal portion of the second projection including the second interlocking member and tilts inward a distal portion of the first projection including the first interlocking member, (c) applying sufficient force to allow a plurality of first interlocking members to engage a plurality of corresponding second interlocking members on opposing sides of the first and second bodies, (d) removing the force and allowing the first body and the second body to return to an unflexed state wherein the first and second bodies are interlocked.

In a further embodiment, one of the first and second bodies is a base of a pallet and the other is a deck of a pallet.

Yet another exemplary embodiment provides a method of disassembling a plurality of bodies connected by interlocks comprising: (a) providing an assembly comprising a first body and a second body interconnected by an interlock, the assembly comprises: (i) a first body including a plurality of first projections positioned along a perimeter of the first body, at least two of the first projections including at least one first interlocking member; and (ii) a second body including a plurality of second projections, at least two of the second projections including at least one second interlocking member for receiving a respective first interlocking member; wherein: each second projection is positioned to engage with a corresponding first projection when the first and second bodies are interlocked, and at least one of the first body and the second body flex for at least one of tilting outward a distal portion of the second projection including the second interlocking member and tilting inward a distal portion of the first projection including the first interlocking member so that a plurality of first interlocking members engage a plurality of corresponding second interlocking members on opposing sides of the first and second bodies, (b) cambering at least one of the first body and the second body by applying force against the body to flex the body, wherein at least one of the first body and the second body tilts outward a distal portion of the second projection including the second interlocking member and tilts inward a distal portion of the first projection including the first interlocking member, (c) applying sufficient force to allow a plurality of first interlocking members to disengage from a plurality of corresponding second interlocking members on opposing sides of the first and second bodies, (d) removing the force and allowing the first body and the second body to return to an unflexed state wherein the first and second bodies are disengaged.

In a further embodiment, one of the first and second bodies is a base of a pallet and the other is a deck of a pallet.

Yet another exemplary embodiment provides an interlock for joining bodies comprising: a) at least a first body and a second body, wherein at least one of the first and second bodies are flexible to allow at least one first interlocking element on the first body to engage with at least one respective second interlocking element on the second body; b) wherein at least one of the first and second interlocking elements rotates inward or outward relative to the other interlock element to allow engagement of the first interlocking element on one of the bodies with the respective second interlocking element on the other of the bodies; c) wherein an interlock formed between the at least one first interlocking and second interlocking elements is maintained when e at least one of the bodies, after being flexed, is returned to an unflexed state; and d) wherein, when the at least one first interlocking and second interlocking elements are engaged, the first and second bodies form at least a portion of a pallet.

In a further embodiment, one of the first and second bodies is a base of a pallet and the other is a deck of a pallet.

Still another exemplary embodiment provides a method of interlocking bodies having interlocks to form a pallet, the method comprising: (a) providing: i) at least a first body and a second body, wherein at least one of the first body and the second body are flexible to allow at least one first interlocking element on the first body to engage with at least one respective second interlocking element on the second body; ii) wherein at least one of the first and second interlocking elements rotates inward or outward relative to the other interlocking element to allow engagement of the first interlocking element on one of the bodies with the respective second interlocking element on the other of the bodies; iii) wherein an interlock formed between the at least one first and second interlocking elements is maintained when at least one of the bodies, after being flexed, is returned to an unflexed state; and iv) wherein, when the at least one first and second interlocking elements are engaged, the first and second bodies form at least a portion of a pallet, (b) flexing a bendable portion of at least one of the first body and the second body by applying force against the body to flex the body, wherein at least one of the first and second bodies tilt outward a distal portion of the second body including the second interlocking element and tilts inward a distal portion of the first body including the first interlocking element, (c) applying sufficient force to allow a first interlocking element to engage a corresponding second interlocking element on opposing sides of the first and second bodies, (d) removing the force and allowing at least one of the first body and the second body to return to an unflexed state wherein the first and second bodies are interlocked.

In a further embodiment, one of the first and second bodies is a base of a pallet and the other is a deck of a pallet.

A further exemplary embodiment provides a method of disassembling a plurality of bodies connected by an interlock, the method comprises: (a) providing an assembly comprising a first body and a second body interconnected by an interlock, the assembly comprising: i) at least a first body and a second body, wherein at least one of the first body and the second body are flexible to allow at least one first interlocking element on the first body to engage with at least one respective second interlocking element on the second body; ii) wherein at least one of the first and second interlocking elements rotates inward or outward relative to the other interlocking element to allow engagement of the first interlocking element with the respective second interlock element; iii) wherein an interlock formed between the at least one first and second interlocking elements is maintained when at least one of the bodies, after being flexed, is returned to an unflexed state; and iv) wherein, when the at least one first and second interlocking elements are engaged, the first and second bodies form at least a portion of a pallet, (b) cambering at least one of the first body and the second body by applying force against the body to flex the body, wherein at least one of the first body and the second body tilts outward a distal portion of the second body including the second interlocking element and tilts inward a distal portion of the first body including the first interlocking elements, (c) applying sufficient force to allow a plurality of first interlocking elements to disengage from a plurality of corresponding second interlocking elements on opposing sides of the first and second bodies, (d) removing the force and allowing at least one of the first body and the second body to return to an unflexed state wherein the first and second bodies are disengaged.

In a further embodiment, one of the first and second bodies is a base of a pallet and the other is a deck of a pallet.

The applicability of the present teachings to other areas and/or apparatus (including, for example, shipping container and/or construction applications) will become apparent from the detailed description provided hereinafter. It should be understood that the detailed description and specific Examples, while indicating certain embodiments of the present teachings, are intended for purposes of illustration only and are not intended to limit the scope of the application and attached claims.

BRIEF DESCRIPTION OF THE DRAWINGS

FIG. 23A is a projection view of an assembled embodiment with wall bodies having male lugs. FIG. 23B is a top view of the embodiment of FIG. 23A. FIG. 23C is a projection view of the embodiment of FIG. 23A with a wall flexed and removed. FIG. 23D is a side view of the embodiment of FIG. 23A. FIG. 23E is a cross-section view taken along line 23E-23E of FIG. 23D with a wall flexed.

FIG. 24A illustrates an embodiment having a cover using flex assembly. FIG. 24B is a top view of the embodiment of FIG. 24A having a cover in a flexed state. FIG. 24C is a cross sectional view of the embodiments of FIG. 24B taken along line 24C-24C.

FIG. 25A is a top view of an embodiment of a pallet with various exemplary interlocking features along with snap locks. FIG. 25B is a cross sectional view of the embodiment of FIG. 25A taken along lines 25B-25B.

FIG. 26A is a top view of an exemplary embodiment of a bayonet lock. FIG. 26B is a cross sectional view of the embodiment of FIG. 26A taken along lines 26B-26B.

DETAILED DESCRIPTION

Figure 1A:
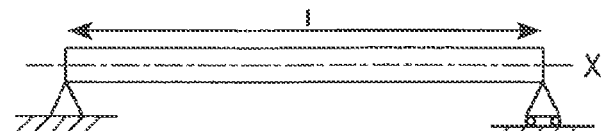
FIGS. 1A and 1B illustrate the location of a neutral axis in a straight and bent object, respectively.

Flex assembly is a method of securely assembling and disassembling two or more bodies, comprising male and female inflexible locking features that interfere in their normal state by:

1. flexing one or more of the bodies so that at least one of their locking features is rotated through an angle opposite the direction experienced in normal use and such that the interference with its mating feature is eliminated, 2. engaging the locking features of the bodies, 3. relaxing the flexing motion while maintaining engagement of the locking features, and 4. disassembling by reversing this process.

In an embodiment, an interlock for joining bodies comprises: (a) a first body including a plurality of first projections, each first projection including a male member; and (b) a second body including a plurality of second projections, each second projection including a female member for receiving a respective male member; where each second projection is positioned to engage with a corresponding first projection when the first and second bodies are interlocked, and at least one of the first body and the second body optionally has a camber axis about which at least one of the first body and the second body flex for tilting outward a distal portion of the second projection including the female member and tilting inward a distal portion of the first projection including the male member so that a plurality of male members engage a plurality of corresponding female members on opposing sides of the first and second bodies. It may be recognized that reference to male or female interlocking elements on a body, thought of as a first body, can also be referred to as a first interlocking element and/or member and that a corresponding female or male interlocking element on a second body, can also be referred to as a second interlocking element and/or member in each exemplary embodiment described in the application and the attached claims. It should be also recognized that each body can included male and/or female interlocking elements in various combinations, configurations and geometries. It is also possible for interlocking elements to have male and female interlocking features in which case the use of a "first" or "second" designation may be more appropriate.

In another embodiment, the first and second bodies are a base and a deck of a pallet.

In yet another embodiment, at least one of the first and second bodies further comprise at least one additional projection centrally located on the element.

In still another embodiment, at least one of the first and second bodies are planar.

In a further embodiment, both the first and second bodies are planar.

In an embodiment, one of the first and second bodies are planar and the other body is at least partially cambered.

In another embodiment, one of the first and second bodies are planar and the other body is domed.

In a further embodiment, the male member is a tongue and the female member is a groove.

In another embodiment, the first and second bodies are both cambered or domed.

In yet another embodiment, both the first planar body and the second planar body have a camber axis about which the first planar body and the second planar body flex for tilting outward a distal portion of the second projection including the female member and tilting inward a distal portion of the first projection including the male member so that a plurality of male members engage a plurality of corresponding female members on opposing sides of the first and second bodies.

In a further embodiment, at least one of the first body and the second body has two camber axes about which at least one of the first body and the second body flex for tilting outward a distal portion of the second projection including the female member and tilting inward a distal portion of the first projection including the male member so that a plurality of male members engage a plurality of corresponding female members on opposing sides of the first and second bodies.

In a still further embodiment, both the first planar body and the second planar body have two camber axes about which the first planar body and the second planar body flex for tilting outward a distal portion of the second projection including the female member and tilting inward a distal portion of the first projection including the male member so that a plurality of male members engage a plurality of corresponding female members on opposing sides of the first and second bodies.

In an embodiment, the second body includes a plurality of second projections positioned at the corners of the second element, and the female member for receiving a respective male member is angled.

In another embodiment, at least one of the first body and the second body comprises a living hinge or a hinge.

In yet another embodiment, at least one of the first body or the second body comprises a plurality of pieces.

In a further embodiment, the plurality of pieces is connected by a hinge.

In yet another embodiment, the interlock allows the first and second bodies to be disconnected without damaging either the first or second element.

In another embodiment, a method of interlocking a pair of bodies having interlocks comprises: (a) providing: (i) a first body including a plurality of first projections optionally positioned along a perimeter or extremity of the first element, each first projection including a male member; and (ii) a second body including a plurality of second projections optionally positioned along a perimeter or extremity of the second element, each second projection including a female member for receiving a respective male member; wherein: each second projection is positioned to engage with a corresponding first projection when the first and second bodies are interlocked, and at least one of the first body and the second body has a camber axis about which at least one of the first body and the second body flex for tilting outward a distal portion of the second projection including the female member and tilting inward a distal portion of the first projection including the male member so that a plurality of male members engage a plurality of corresponding female members on opposing sides of the first and second bodies, (b) cambering at least one of the first body and the second body by placing force against the body to flex the body and form a camber axis, wherein at least one of the first body and the second body tilts outward a distal portion of the second projection including the female member and tilts inward a distal portion of the first projection including the male member, (c) applying sufficient force to allow a plurality of male members to engage a plurality of corresponding female members on opposing sides of the first and second bodies, (d) removing the force and allowing the first body and the second body to return to an unflexed state where the first and second bodies are interlocked.

In a further embodiment, a method of disassembling a plurality of bodies connected by interlocks comprises: (a) providing an assembly comprising a first body and a second body interconnected by an interlock, the assembly comprising: (i) a first body including a plurality of first projections optionally positioned along a perimeter or extremity of the first element, each first projection including at least one male member; and (ii) a second body including a plurality of second projections optionally positioned along a perimeter or extremity of the second element, each second projection including at least one female member for receiving a respective male member; where each second projection is positioned to engage with a corresponding first projection when the first and second bodies are interlocked, and at least one of the first body and the second body has a camber axis about which at least one of the first body and the second body flex for tilting outward a distal portion of the second projection including the female member and tilting inward a distal portion of the first projection including the male member so that a plurality of male members engage a plurality of corresponding female members on opposing sides of the first and second bodies, (b) cambering at least one of the first body and the second body by applying force against the body to flex the body and form a camber axis, wherein at least one of the first body and the second body tilts outward a distal portion of the second projection including the female member and tilts inward a distal portion of the first projection including the male member, (c) applying sufficient force to allow a plurality of male members to disengage a plurality of corresponding female members on opposing sides of the first and second bodies, (d) removing the force and allowing the first body and the second body to return to an unflexed state wherein the first and second bodies are disengaged.

In yet another embodiment, the step b of the above method of disassembling a plurality of bodies connected by interlocks comprises forming a camber of the first body and the second body by placing a force against the body to flex the body and form a camber axis wherein the first body and the second body tilts outward a distal portion of the second projection including the female member and tilts inward a distal portion of the first projection including the male member, wherein the amount of force applied allows a plurality of male members to disengage a plurality of corresponding female members on opposing sides of the first and second bodies.

In exemplary embodiments, various materials can be used, including, but not limited to a resin, wood, metal, a composite, a blend, combinations thereof and the like.

It is to be understood that this application is not limited to particular embodiments described. It is also to be understood that the terminology used herein is for the purpose of describing particular embodiments only, and is not intended to be limiting, since the scope of the present application will be limited only by the appended claims.

Unless defined otherwise, all technical and scientific terms used herein have the same meaning as commonly understood by one of ordinary skill in the art. Although any methods and materials similar or equivalent to those described herein can also be used in the practice or testing of exemplary embodiments, specific preferred methods and materials are now described.

Figure 1B:
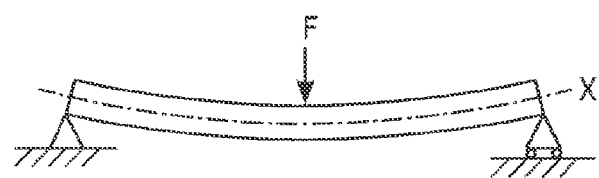

FIGS. 1A and 1B illustrate the location of a neutral axis in a straight and bent object, respectively. The neutral axis is an axis in the cross section of a beam or shaft along which there are no longitudinal stresses or strains. If the section is symmetric, isotropic and is not curved before a bend occurs, then the neutral axis is at the geometric centroid. Material on one side of the neutral axis is in a state of tension, while material on the opposite side of the axis is in compression. The neutral axis is shown as the axis X in FIG. 1A.

The pallets and containers described herein are comprised of a plurality of bodies, such as a deck, base, wall and a top. A body can be flexed due to its natural flexibility or purposely designed to flex, such as with a living hinge or hinge. Flexing a body has the following geometric effects:

Points on the concave side, along the neutral axis and on the convex side close to the neutral axis converge.

Points on the convex side further away from the neutral axis to diverge.

A rotational angle is formed in the body relative to its un-flexed state which increases with the distance from the center of the bend.

Figure 2:
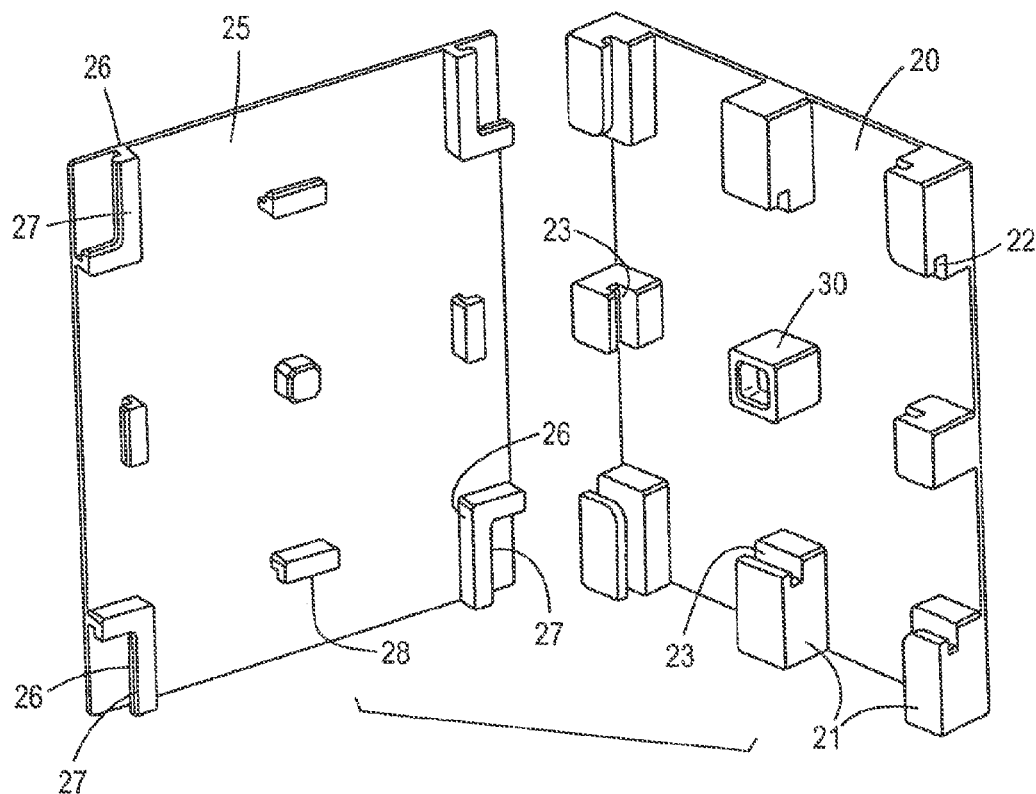
FIGS. 2-4 schematically illustrate a two-piece pallet interconnected according to an exemplary embodiment, with top and bottom pieces shown book-leaved in FIG. 2, cambered for assembly in FIG. 3, and assembled in FIG. 4.

FIG. 2 schematically shows two bodies, a pallet base 20 and deck 25, positioned to fold together and interlock according to an embodiment of the invention. The usual strengthening ribs, gussets, and channels that are incorporated into resin pallets are eliminated from the schematic views in all of the figures to simplify the illustration and make the interlocking of the two pallet parts more easily understood.

The interlocking elements shown in the various figures include male and female interlocking elements. These figures are shown as exemplary embodiments to illustrate possible configurations. In other embodiments, the male and female elements shown in the figures can be interchanged. In other embodiments, the male and female elements on a body can be replaced by a combination of male and female elements, and the second body will have a corresponding element. The various interlocking elements can be present in various combinations, configurations and geometries and can be comprised of the same or different materials than the body they are positioned on.

Figure 3:
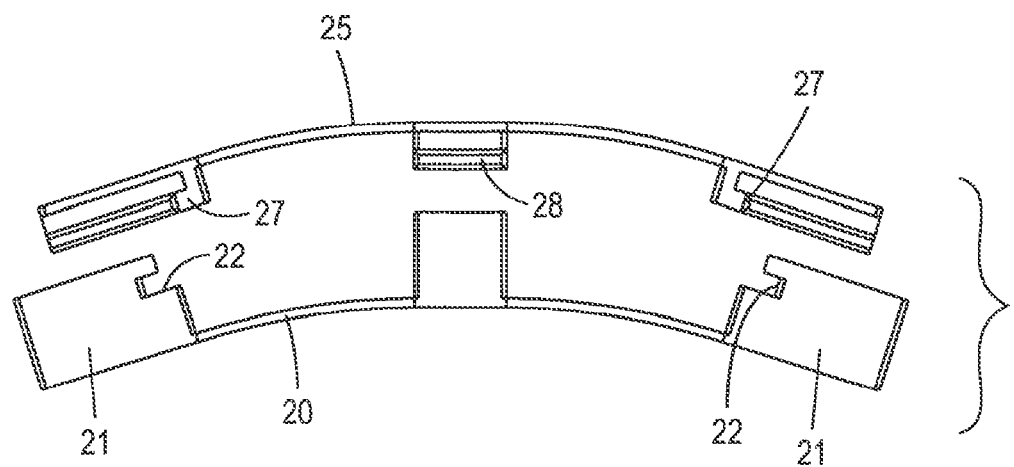

Pallets are typically structured with a base 20 having upstanding pedestals or columns 21 arranged with three columns on each rectangular side of a pallet base. The term "pedestal" or "column" refers to a structural element that transmits the weight of the structure above the structural element to surfaces in contact with the bottom portion of the base. The shape and configuration of the pedestals or columns can be varied from those shown in the figures, provided that the interlocking male and female members described below are provided in the pedestals, columns or directly in the bodies themselves. In an embodiment, a column is located approximately at each of the four corners of the base and a column is also located on each side of the base approximately between two corner columns. This provides for eight columns 21 located along the edges of the base. A central column 30 can also be centrally located on the base. The central column 30 can be formed differently from the peripheral columns. The top or deck of a pallet has eight corresponding columns 26 extending downward to meet an interlock with each of the corresponding base columns 21. The region where the base columns meet the deck columns are preferably provided with positive interlocks in the forms of male members and female members. As shown in FIGS. 1-3, female members 22 and 23 are formed in the base columns 21, and male members 27 and 28 are formed in the decks columns 26, but this can be reversed. In another embodiment, the top or deck of a pallet can have a central column 31 that contacts the central column 30 in the base.

Figure 4:
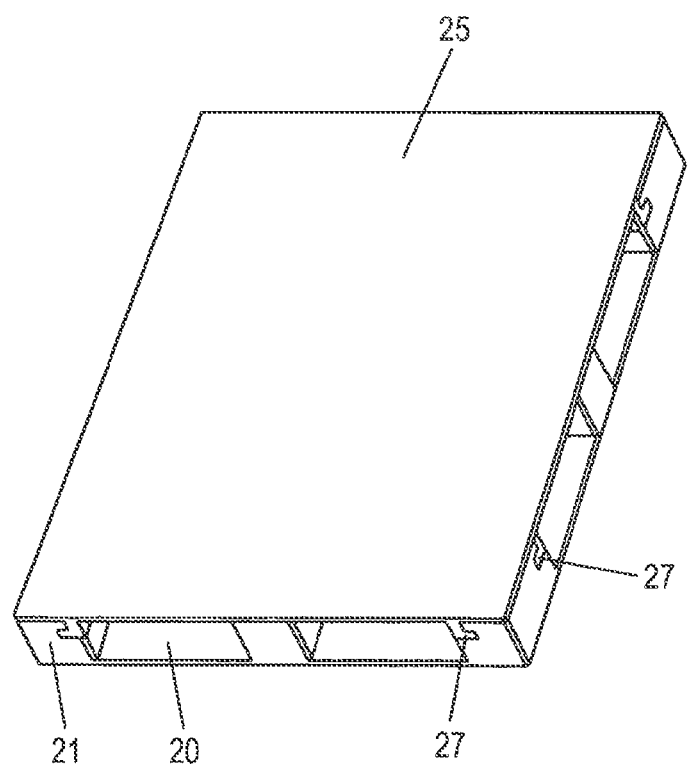

FIGS. 2-4 show eight peripheral columns 21 extending upward from base 12, each column having an interlock in the form of a female member that can interlock with projections in corresponding columns 26, extending downward from pallet deck 25. In this embodiment, the male members 27 are angled and face the corner regions of the pallet deck 25, and linear male members 28 are arranged in the centers of each side of deck 25 and face the outer edge closest to the male member. Corresponding angled female members 22 in pallet base 20 are positioned to receive the angled male members 27, and linear female members 23 in the middle of each side of pallet base 20 receive linear male members 28 of pallet deck 25. These configurations can be varied widely.

The male members 27 and 28 and female members 22 and 23 that interlock at peripheral regions of the pallet base 20 and deck 25 are themselves relatively rigid and inflexible.

Figure 5:
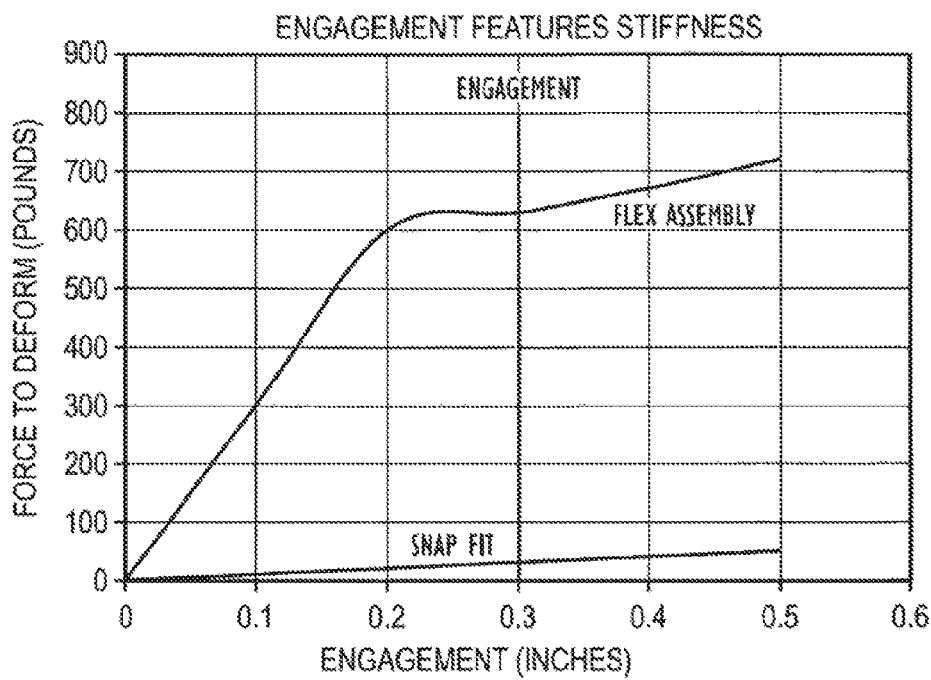
FIG. 5 shows the relationship between the amount of engagement (in inches) and the pounds of force needed to deform or flex the element. This figure is an illustration of the relationship between the amount of force applied to deform or flex a body and the amount of engagement that results.

Unlike most snap fasteners that are flexible, the male members and female members proposed by exemplary embodiments are strong, durable, positive, and inflexible in their operation. One skilled in the art would understand that the term rigid means that the material is not flexible and is not able to be bent or forced out of its normal shape. Such a person would also understand that the term flexible means that the material is capable of being bent or flexed without breaking A graph of the relationship between the amount of engagement (in inches) and the pounds of force needed to deform or flex the body is shown in FIG. 5. This figure is an illustration of the relationship between the amount of force applied to deform or flex a body and the amount of engagement that results.

Figure 6:
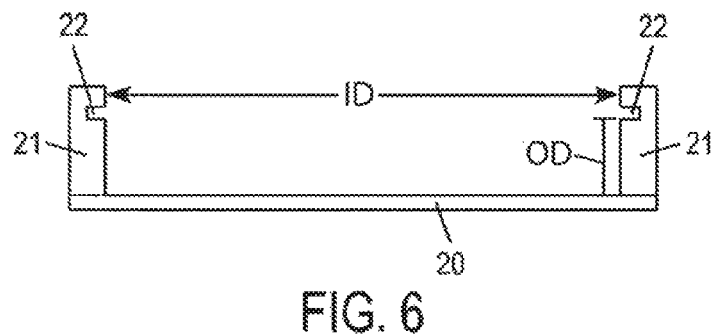
FIGS. 6 through 9 schematically show the effects of bending the base in FIGS. 6 and 7 and the deck in FIGS. 8 and 9.
Figure 7:
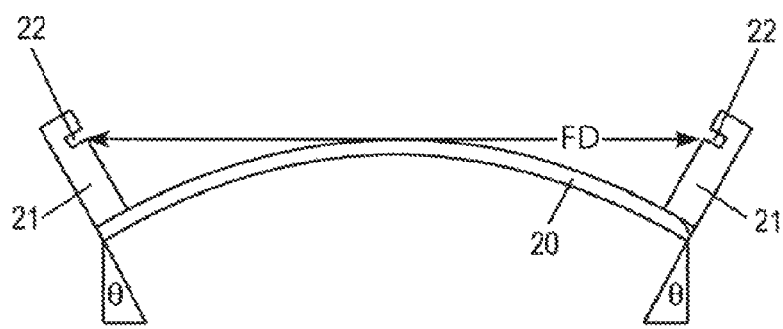

The spans of resin, or other suitable material, such as steel, aluminum, composites or wood, that interconnect the confronting columns 21 and 26 of base 20 and deck 25 are flexible enough to allow bending of the base 20 and/or deck 25 to cambered positions that allow the male members and female members to interlock. In the various embodiments, the base flexes to allow the male and female elements to engage, while the male and female elements are rigid. This is different from snap-tab engagement methods where an engagement element flexes and the body is relatively rigid. (However, in exemplary embodiments, snap-tabs or snap fittings can be used to provide further strength and/or rigidity.) This is best shown schematically in FIGS. 6 and 7, which uses base 20 as an example. Columns 21 extend upward from base 20 so that female members 22 extend above base 20 by an offset distance OD. The normal flat configuration of base 20 is illustrated in FIG. 6. In the flat configuration, the distant between the two columns 21 is referred to as the interlock distance ID. When the base 20 is flexed in the direction shown in FIG. 7, the structure of the elements changes shape as shown in FIG. 7. because the resin, or other suitable material, connecting columns 21 with the base 20 is flexible allowing base 20 to be bent into a camber. The distal portion of the column 21 moves outward relative to its position in the unflexed state, while the proximal portion of column 21 moves inward relative to its position in the unflexed state. The flexing of the base 20 causes the columns 21 to be positioned at an angle θ relative to its original angle in the unflexed position. The flexing of the base 20 causes the distance between the columns 21 to increase to a flex distance FD between the columns 21 as shown in FIG. 7. This spreads the columns apart slightly so that male members from a superposed pallet deck can fit into base female members 22.

Another way of expressing this is that bending the base 20 makes the columns 21 spread apart as they angle so that a distance between female members 22 increases by a departure distance, which can be calculated as explained below.

The amount of increased distance that can be produced between the columns is a function of several factors including the nature of the material in the body and the columns, the configuration of strengthening ribs, gussets, and channels that are incorporated into the body, the amount of force used to flex the body, and the shape and size of an object that can be pressed against the body to flex the body.

The amount of bending required in a body can depend upon the orientation and configuration of the locking elements. The distance on the column from the base to the female member is an important factor in determining the amount of distance the opening between the columns must increase to allow the male and female members to engage. This is possible because the bending produces an angle θ to which the columns move. As the distance from the base to where the female member is located on the column increases, the greater the amount of separation that results from the same angle θ. The sine of angle θ times the offset distance OD produces an increased spatial separation between female members 22. The larger the offset distance OD from the flexible span 20 to female members 22, the greater will be the amount of departure distance that the female members move when the base is flexed, as shown in FIG. 7. Depending upon the offset distance OD from the flexible span 20 to female members 22, the bending of base 20 as shown in FIG. 7 may be adequate to assemble the deck projections male members 27 to be positioned directly into the base female members 22. In an embodiment, the amount of bending required can be reduced by first inserting one set of male members located along one side of the body into the corresponding female members.

Figure 8:
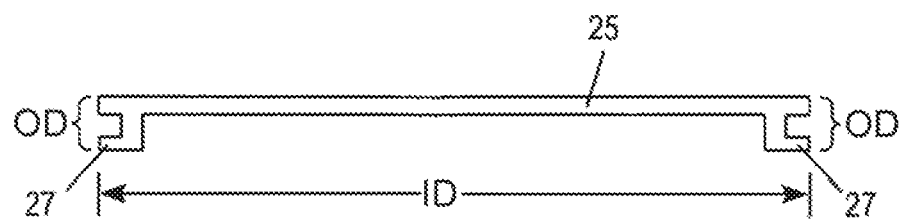
Figure 9:
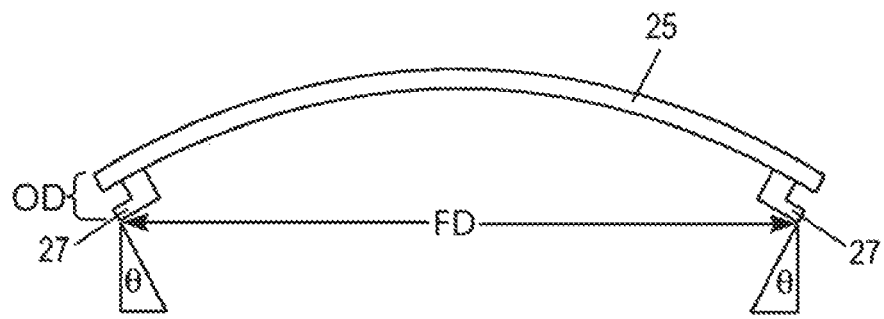

An opposite effect occurs when deck 25 is flexed between its normal position shown in FIG. 8 and its cambered position shown in FIG. 9. Although the offset distance from deck 25 for male members 27 is small, male members 27 nevertheless flex to a shorter intra-projection distance when deck 25 is cambered, as shown in FIG. 9. A pallet requires about 5" separation between the top of the load bearing deck and the bottom straps that support columns. The interlocks could be designed to meet at the middle of the 5" columns, or toward either end. Location of the interlocks can then be effected by the bendability of the top or bottom. For example, a pallet bottom can be more flexible than a top deck, and can place the interlocks above the middle of the columns extending between the top and bottom so that bending the base spreads base interlocks apart far enough to receive deck interlocks. It is also possible to design the base and the deck so that bending of each is required for an optimum interlock between the two.

The right triangle shown in FIGS. 7 and 9 schematically exaggerates the bending angle necessary to assemble male members and female members of the interlock. The female members in the base columns have an offset distance OD from the bendable span of the base. The right triangles show that the sine of the angle θ bending the columns 21 can be multiplied by the offset distance OD to determine the increased flex or departure distance between female members 22 when base span 20 is cambered.

In a similar way, triangles shown in FIG. 9 can use the sine of the angle θ times the smaller offset distance OD to show that the male members 27 of deck 25 move to a shorter flex distance FD when deck 25 is cambered to the position illustrated in FIG. 9. It is possible to assemble a pallet by bending only one of the bodies to receive the other. This would depend on which body has the taller columns with the longer offset distance OD.

Bodies whose locking features are assembled substantially parallel to the neutral axis of bending most effectively use the convergence and divergence of points along the bodies to create assembly clearance for locking features. When two parallel bodies are flexed the same amount in the same direction their surfaces remain substantially parallel, as in the shingling of a stack of paper. This allows for the locking features to engage in a sliding motion. When only one of the bodies is flexed, the locking features can engage in a combined sliding/rotating motion. In certain embodiments, engagement of bodies can be achieved by horizontally sliding one body with respect to another (in a cambered or relaxed state) to allow engagement of an interlocking element on one body with a corresponding interlocking element on the other body. In these cases, it may be preferable to use curved locking features to eliminate the clearance needed to accommodate the rotating motion. Parallel bodies that are spaced a distance apart can effectively use projections away from the neutral axis of bending to amplify the geometric effect, providing greater lock engagement.

Bodies whose locking features are assembled substantially perpendicular to the neutral axis of bending most effectively use the rotation angle to create assembly clearance for locking features.

The further the locking features are located from the center of bending, the greater the depth of engagement can be achieved. For this reason, a preferred embodiment includes locking features located on the perimeters or extremities of the bodies.

In most cases, some of the locking features can be engaged without deforming the bodies. Sometimes the locking features must be engaged by flexing the bodies in a sequence of flexing steps, which can require secondary flexing to separate locking features not yet engaged. In some cases locking features can be engaged by flexing in a domed fashion.

It is also possible to design the male members and female members of the interlock so that the interlock establishes a tension between the base and the deck. Such a tension can hold the base and the deck to very slightly cambered positions that flatten out when a load is applied to a pallet deck. This can ensure that an interlock force continuously urges the two pallet bodies into a tight interlock. The interlock tension preferably involves compression force on the deck interlocks and tension force on the base interlocks. Another preference in the design of pallet interlocks is to form detents that seat together in a home position of the interlock. The detents will result in a click sound when the interlocks are fully engaged with each other. The detents can also be structured so that the pallet assembles with somewhat less force than is necessary to disassemble it.

Another factor in two-piece resin pallet design according to exemplary embodiments can be the physical and chemical properties of the materials involved. Stress, strain, creep, and other considerations can be used to ensure that the interlocks are strong and long-lived.

Figure 10:
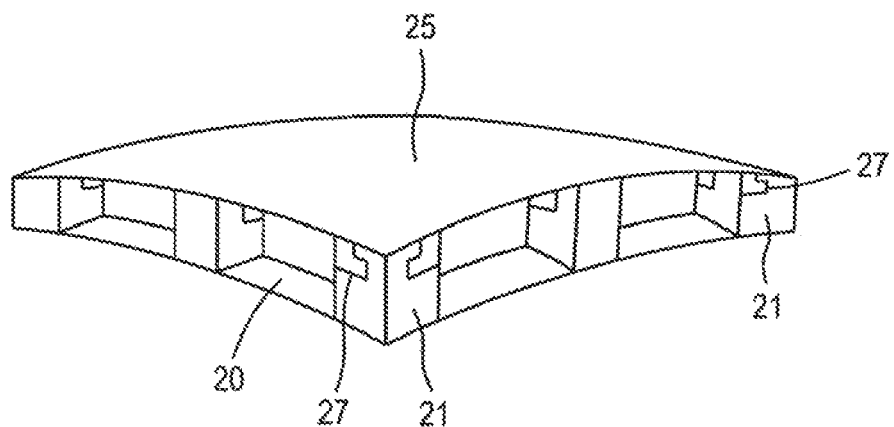
FIG. 10 schematically shows the domed effect of bending the sides and the ends simultaneously to achieve an interlock.

The cambered bending of the base or deck of the pallet can also be done on two perpendicular axes simultaneously to result in a domed effect, as illustrated in FIG. 10. This can bend these parts not only from side-to-side, but from end-to-end, for example, to dome each of the pallet halves into positions where the male members and female members can all be fitted together simultaneously. All that is needed is a fixture to hold both sides and ends of the pallet parts 20 and 25 in contact together while a lifting force is applied in a central region of the pallet to bend the base and the deck into domed cambers. This moves the male members and female members to their flex distances, which allows them to interlock. As the lifting force relaxes and the base 20 and deck 25 return toward their original configurations, the interlock secures them tightly together. The resulting assembly is especially strong and durable to resist breakage or separation during the rough life of pallets.

The domed or cambered bending of the parts is also in an opposite direction to any movement that the pallet will experience in bearing loads. Once the deck and base of a pallet are interlocked, by bending and doming these parts until they fit together, they stay solidly interlocked during the pallet's life, because the pallet does not encounter any force during normal use that will bend its parts into a cambered or domed configuration such as is required to assemble the interlocks. On the other hand, an assembled pallet can be bent in a domed configuration to unlock the male members and female members for cleaning, replacement of parts or other repairs.

To summarize, an interlock combination can comprise: mating male members and female members that do not flex; the male members and female members are disposed on bodies at least one of which is flexible in a span between the interlocks; the male members and female members are offset from the flexible body by an offset distance (od) so that flexure of the body angles the interlocks to an angle θ and makes the interlocks depart from unflexed positions by a departure distance (dd); the departure distance (dd) of the interlocks equals the sine of the angle θ times the offset distance (od) of the interlocks from the element; and the departure distance resulting from the flexure is sufficient to assemble the bodies into an interlock or disconnect the bodies from an interlock.

Interlocks having mating male members and female members connecting a pair of bodies in a combination can comprise: interlocks that are spaced apart on the bodies by an interlock distance; the bodies are flexible in spans between the interlocks so that flexing the bodies angles the interlocks by respective angles θ; the male members and female members of the interlocks are offset from the spans of the flexible bodies by respective offset distances (od); the interlocks move from the interlock distance by a respective departure distance (dd) when the bodies flex and angle the interlocks; the respective departure distance (dd) equals sine of each respective angle θ×the respective offset distance (od); and moving the interlocks by a total of the respective departure distance enables the interlocks to be assembled or disassembled.

Interlocks having mating male members and female members connecting a base and a deck of pallet in a combination can also comprise: a span of the base spaces the interlocks apart; the span of the base is flexible enough to be bent into a camber which angles the interlocks apart; and angling the interlocks apart allows the male members and female members to interlock, which is not possible unless the interlocks are angled apart.

A method of interlocking a pair of bodies having interlocks with rigid male members and female members can comprise: separating the interlocks by a flexible span of one of the bodies; offsetting the male members and female members of the interlocks from the flexible span of the element; flexing the body span to angle the interlocks to depart from unflexed positions; using the departure of the interlocks from flexure of the body span as the only non-destructive way to assemble the male members and female members or disassemble the male members and female members.

A pair of bodies interconnected by interlocks can occur in a combination comprising: interlocks having rigid male members and female members that cannot be assembled in an original state of the bodies; wherein the interlocks on the bodies are disposed so that bending at least one of the bodies from the original state angles the interlocks to positions enabling the interlocks to be assembled and disassembled; and wherein when the interlocks are assembled, they cannot be disassembled without flexing the flexible element.

Exemplary embodiments allow for parts to be assembled with flexing on numerous axes around the center pivot point. Possible flex axes can include the axis running across the narrow dimension of the pallet, across the wide dimension of the pallet, any diagonal axis through the center of the part or in all axes through the center of the part by flexing the parts in a dome shape with the center at the apex. A preferred embodiment involves flexing in a specific sequence, first along the narrow dimension axis to lock the center elements or members on the wide side of the pallet, then along the wide dimension of the pallet to lock the corner and center elements or members on the narrow side of the pallet simultaneously.

Flex locks can be located within or outside each perimeter member or element and extend under the top deck of the pallet. In a preferred embodiment, locks are extended from each member or element, of the pallet toward the center of the pallet in the direction of rotation for assembly. This geometry, which can be anchored to the structure of the members or elements of the base of the pallet and cantilevered out under the top deck, substantially reduces the deflection of the pallet by reducing the effective span between the members or elements. These features can be extended to reach neighboring members or elements to approach the structure of a one piece pallet.

A pair of generally parallel bodies interlocked in a combination comprising: male members and female members of the interlocks are rigid and are separated by flexible spans of the bodies so that flexing the body spans changes the separation of the interlocks and allows the interlocks to be assembled together in a way that is not possible unless the body spans are flexed.

Figure 12:
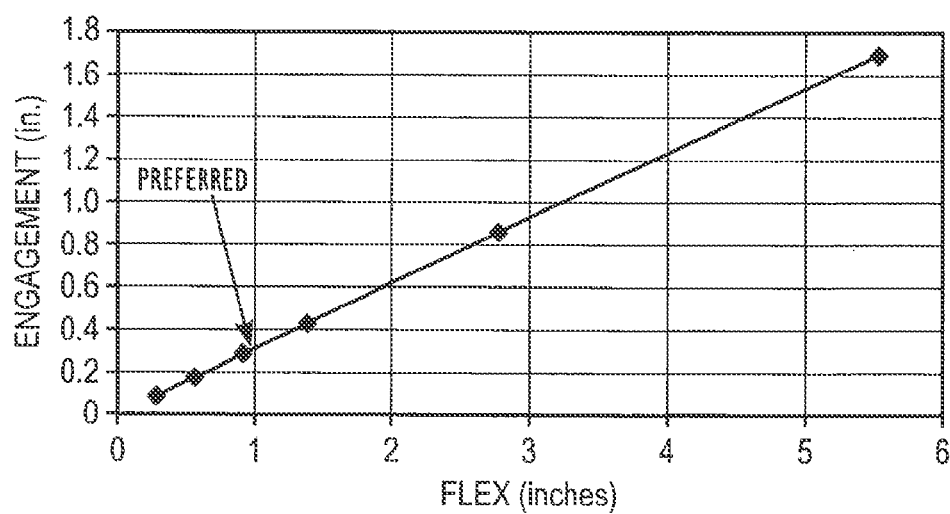
FIG. 12 illustrates the relationship between flex and engagement.

The equations on the following pages are provided for an exemplary two-piece pallet embodiment and show how a flex angle of one of the pallet bodies can determine the angle θ shown in FIGS. 7 and 9 to calculate the length of an engagement available between male members and female members to achieve a tight interlock fit by opening the columns to allow the male members on both sides of a body to engage the corresponding female members. In an embodiment, the distance (or angle to which) the columns are required to move can be reduced by first inserting one set of male members located along one side of the body into the corresponding female members. The equations apply to a simply supported beam, where the length of the beam is 2 L and X=L or ½ the beam length. Equations for the angle θ are derived for the equation for Y and the differential of Y with respect to X is the slope of the deflection curve. When reasonably typical values are substituted, an engagement range of about 0.125" to about 0.75" (the preferred range is about 0.25" to about 0.5") can be achieved by adjusting the flexible deflection to achieve the desired angle θ. The offset distance (od) is limited to about 5" in a pallet, but can be significantly less for one pallet part. A deck and base can share the about 5" od, and the proportion of the sharing can relate to the stiffness of the respective bodies. The engagement of the male members and female members is also limited to the size of the column or foot that extends between the deck and the base. Since columns in resin pallets, and other suitable material, are preferably in a range of the about 5-9" in footprint, this is far more than necessary for a preferred od engagement in the range of about 0.125 to about 0.75". (The preferred range is about 0.25" to about 0.5". A graph of a preferred result is shown in FIG. 12.

ENGAGEMENT

DEFINITION OF TERMS     $F := 200$   $E := 300000$   $B := 40$

L    1/2 LENGTH                $L := 24$    $H := 1$
E    MODULUS
H    HEIGHT
B    BASE WIDTH
Y    DEFLECTION
X    POSITION ALONG LENGTH
Θ    MAX SLOPE
OD   OFFSET DISTANCE
F    FORCE
I    MOMENT OF INERTIA     $I := \dfrac{B \cdot H^3}{12}$    $I = 3.333$

SIMPLY SUPPORTED BEAM:

$$Y(x) := \dfrac{F \cdot x^3}{6 \cdot E \cdot I} - \dfrac{F \cdot L \cdot x^2}{2 \cdot E \cdot I} \qquad Y(24) = -0.922$$

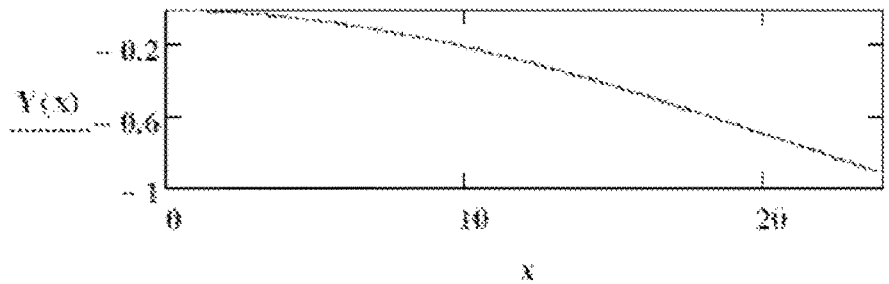

$$\dfrac{d}{dX} Y(X) \rightarrow \dfrac{X^2}{10000} - \dfrac{3 \cdot X}{625} \qquad \Theta := \dfrac{-F \cdot L^2}{2 \cdot E \cdot I}$$

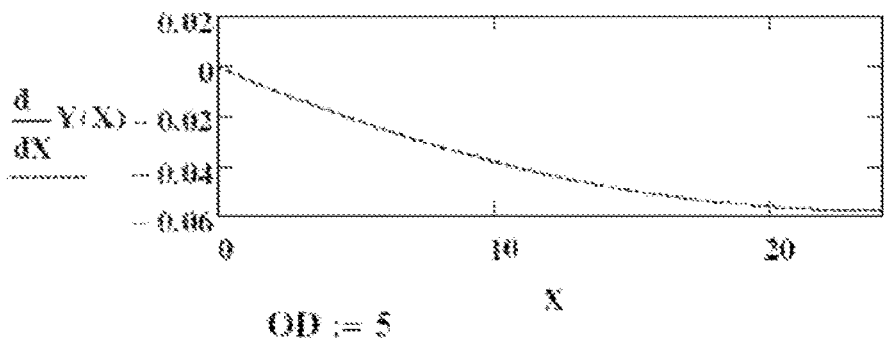

$OD := 5$ $\Theta = -0.058$

ENGAGEMENT $:= OD \cdot \sin(\Theta) = -0.288$

The equations below illustrate the proportional stiffness to moment of inertia of top and bottom bodies of an exemplary embodiment of a two piece pallet. The top deck is calculated for a 1" thick beam and the base is calculated for a 0.5" beam. The total pallet height is established at 5". This information is applied to calculate a center of gravity, and finally a ratio of the increased stiffness obtained by fastening the deck and the base together securely with positively interacting male members and female members. The typical calculations shown in the equations put the ratio at about 65:1 increase in stiffness when the pallet deck and base are securely interlocked. A preferred range for such ratio runs from about 40 to about 80:1.

DEFINITION OF TERMS

- I — MOMENT OF INERTIA OF INDIVIDUALS
- II — MOMENT OF INERTIA COMBINED
- CG — CENTER OF GRAVITY
- r — DISTANCE TO CENTER OF GRAVITY
- B — BASE LENGTH
- H — HEIGHT
- h — POSITION OF CENTER OF GRAVITY

STIFFNESS OF INDIVIDUAL TOP AND BOTTOM DECKS:

$$B_1 := 40 \qquad H_1 := .5 \qquad h_1 := .25$$

$$B_2 := 40 \qquad H_2 := 1 \qquad h_2 := 4.5$$

$$I := \sum_{i=1}^{2} \frac{B_i \cdot (H_i)^3}{12} = 3.75$$

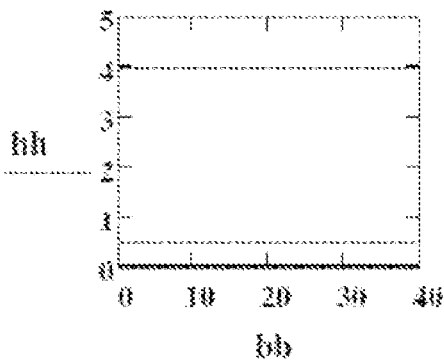

STIFFNESS OF COMBINED TOP AND BOTTOM DECKS:

$$CG := \frac{\sum_{i=1}^{2} (B_i \cdot H_i \cdot h_i)}{\sum_{i=1}^{2} (B_i \cdot H_i)} = 3.08$$

$$r := h - CG \qquad \text{PARALLEL AXIS THEOREM}$$

$$II := I + B_1 \cdot H_1 \cdot (r_1)^2 + B_2 \cdot H_2 \cdot (r_2)^2 = 245$$

$$\text{RATIO} := \frac{II}{I} = 65.2$$

Figure 11:
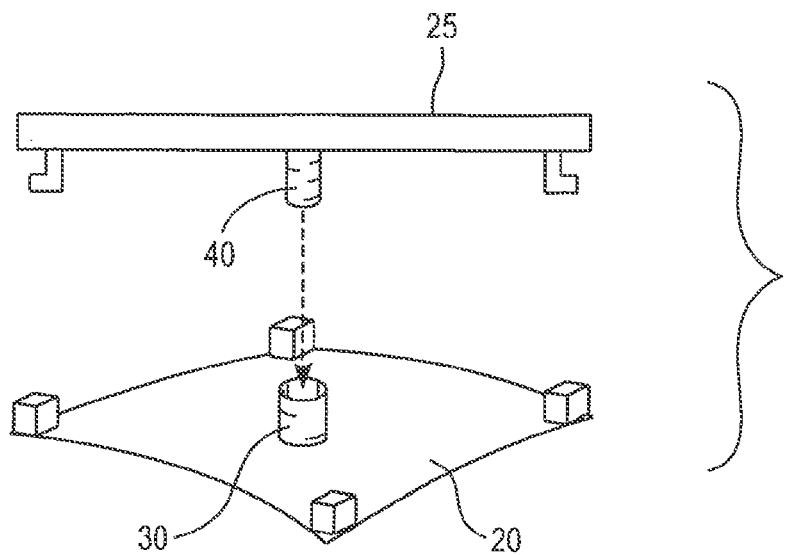
FIG. 11 schematically illustrates a center post assembly method for interlocking a center post between a pallet deck and base.

FIG. 11 shows a way of interlocking a center post between a pallet base 20 and a deck 25. For simplicity of illustration, only corner feet are shown on base 20 instead of the eight corners and side feet preferably used. Base 20 is formed with an upstanding cylindrical center post 30, and pallet deck 25 is formed with a center post 40 that can telescope within post 30. Doming base 20, as illustrated in FIG. 11 elevates center post 30 upward so that post 40 of deck 25 can be extended down into center post 30. Either or both posts can be hollow, and the engagement between posts 30 and 40 is preferably snug, to eliminate places for dirt to deposit.

Posts 30 and 40 can also have respective parts of a bayonet joint schematically illustrated in FIG. 11. This allows deck 25 to be angularly oriented relative to base 20 to allow post 40 to extend all the way into post 30. When deck 25 is rotated back to registry with base 20, the bayonet joint engages and locks posts 30 and 40 together. This adds additional locking strength between deck 25 and base 20, and also helps secure posts together to prevent any dirt collection.

Pallets are subjected to substantial application forces acting to separate or pry apart the top and bottom of a 2 piece pallet assembly. These forces can often be applied with pallet jacks which fit under pallets and are jacked up to lift the pallet off the floor when the wheels of the pallet jack locate on the pallet strap of bottom piece of the pallet. Exemplary embodiments allow for substantially greater strength in resisting such forces relative to more common snap locks. This is a result of the fact that snap locks must be sufficiently weak and flexible to engage, limiting their strength in resisting disengagement, where the interlocking features using the flex assembly method can be as stiff and strong as the material and design permit, since they are engaging by sliding together. The geometry of the interlocking features can take many forms including, but not limited to, semi-circular, triangular, elliptical, rectangular contact areas, combinations thereof and the like. A preferred exemplary embodiment is a rectangular box with ribs extending from the locking surfaces along the axis of disengagement force and tied into elements of the overall part to create locks that can withstand forces such as those described above.

The flex assembly facilitates disassembly by flexing in the direction opposite from the application force. In the case of a pallet, disengagement can be accomplished by pushing down the perimeter of the pallet, while supporting it in the center. A preferred embodiment includes the use of snap locks that engage in the horizontal axis, parallel to the direction of interlock engagement to further keep parts together and resist disassembly force. These snap locks can be one-way snap locks that provide modest resistance to pallet assembly forces based on the angle of taper on the trailing surface of the snap fingers and prevent disengagement of pallets without failure of the snap fingers with a surface on the leading edge of the snap fingers which is perpendicular to the assembly direction. Alternatively, in a preferred embodiment, snap fingers can be tailored to allow disassembly without damage to both parts with an amount of force that is greater than the assembly force and would not otherwise be seen in the application. This can be accomplished with taper on the leading edge of the snap fingers that is steeper than the slope of the taper on the trailing edge, requiring a greater force to cause fingers to flex to the unlocked position.

Where it is desired to allow the two bodies to breath or have areas of no contact or space, it is possible to provide clearance or a compliant feature within the locking element. While preventing the bodies from completely separating, this type of connection can allow a defined maximum amount of separation. The bodies can return to a contacting position via gravity or a spring element.

When it is desirable to further prevent or substantially inhibit inadvertent disassembly of the bodies, several means of maintaining the engagement of the locking elements can be employed, including, but not limited to pins, fasteners, welds, snap locks, detents, combinations thereof and the like.

When it is desirable to seal the interface between the bodies several means can be employed, including, but not limited to encapsulation, calk, glue, gasket, welding, an interference fit, combinations thereof and the like.

When bodies are to be locked together to form a structural assembly it is possible to preload the locks by providing an interference in the engagement direction. It is also possible to provide a press fit or a matching taper fit perpendicular to the engagement direction to eliminate any deflection due to clearance of the locking elements.

Flex assembly can be performed manually or automatically. The process can be integrated with the molding process when the parts are warm and more easily flexed, especially when family molds are used. The added advantage is that the parts fixture each other to minimize warping during cooling.

Exemplary embodiments described herein can realize advantages over the following other designs or assembly methods described below. When welding or gluing the bodies together, it is not possible to disassemble the article for cleaning or repair. The use of snap fit connections provides connections that are inherently weaker due to the need to flex the locking elements and provides looser connections due to the clearance required to allow the snap feature to engage. The use of pins or fasteners requires additional pieces to assemble and the parts can become dislodged and fall into undesirable locations.

Exemplary embodiments can also be applied to other applications such as the base and walls of a bulk container where the application requires a stiff panel that can resist substantial force with minimum deflection, especially where the force is applied primarily in one direction perpendicular to the panel. This would be the case for the pallet base of any bulk container as well as the side walls of a bulk container for carrying loose loads that exert hydrostatic pressure outward.

The flex assembly relies on the displacement of the 2 parts along the horizontal axis as the parts are flexed over a pivot point in the center. This displacement is a function of the flex angle and the distance from the pivot point. At the pivot point—the center foot of a pallet in the preferred embodiment, there is no displacement to create locking, so an alternative locking method is required. This can be done with no locking allowing parts to slide in and out in the vertical plane as well as using snap fits, fasteners, adhesives or welding, but a preferred embodiment uses a rotating or bayonet locking method. This locking is accomplished by first flexing the bottom part on all 4 sides to clear, bringing the top and bottom part together out of square, then rotating only the top part to engage locks and square up the parts. This locking mechanism offers similar advantages to the flex locks over other methods such as snap locks in that zero clearance gaps can be achieved and the locking geometry can be substantially stiff and strong in resisting separation forces.

An additional benefit of exemplary embodiments in the application is the ability to design interlocking features with zero, or substantially zero, gap between parts in the assembled position. Snap locks require clearance to allow the lock to rotate out and back into place. The greater the engagement and the greater the length of the flex tab the more clearance is required. This clearance translates into a gap between parts when loaded and inefficiency in the transfer of load between the 2 parts which decreases the stiffness of the assembly. In exemplary embodiments, locks can be designed with zero, or substantially zero, clearance to eliminate gaps and facilitate optimum load transfer between parts. Minimizing the gap between parts is critical in applications such as food handling where gaps can translate into trapped contamination.

EXAMPLES

Pallet Pull-Apart Test

Four pallets samples were tested to determine the relative resistance of different pallet assembly methods to forces acting to separate the top deck from the bottom base of pallets, such as those applied by pallet jacks. 7" wide by 48" long strips of pallets were tested to isolate one fork pocket opening on the long side of the pallet, most frequently accessed by pallet jacks. A hydraulic jack was used to separate the top deck from the bottom frame in one fork pocket opening. A load cell was used to measure the force applied by the hydraulic jack. Each stroke of the jack translated into 0.71" of displacement. The force was recorded after each stroke to determine the load required for each 0.71" increment of the displacement. Each of four pallet samples were tested to failure. The four pallets tested represented three common methods of pallet assembly and the flex assembly method, which is the subject of the exemplary embodiments described herein. The pallet material was plastic resin, unless otherwise noted.

1. Flex Assembly
2. Welded Assembly
3. Nailed Wood Assembly
4. Snap Fit Assembly.

Figure 13:
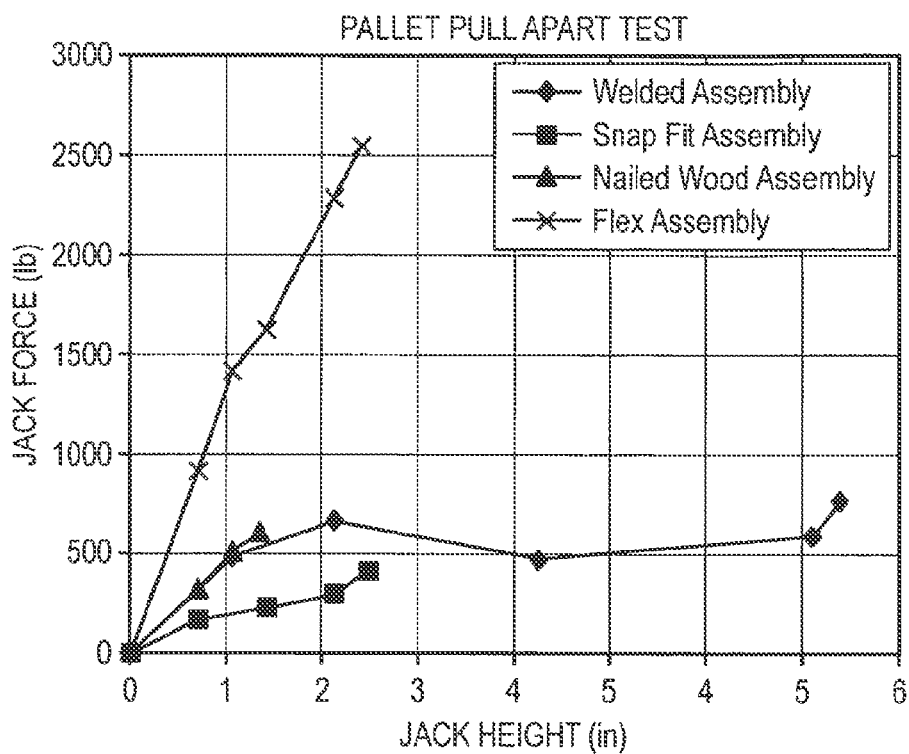
FIG. 13 illustrates the comparative results of a pallet pull-apart test of a pallet assembled by the flex assembly process and pallets assembled by other processes.

The results of the test is shown in FIG. 13.

In the embodiments provided below, the interlock can preferably be made by connecting the female and male members in a specific sequence. The sequences of connecting the female and male members can be described by considered a body as being a 3.times.3 matrix having the designations shown below.

| 1 | 2 | 3 |
|---|---|---|
| 4 | 5 | 6 |
| 7 | 8 | 9 |

In each of the embodiments discussed below, each body can be considered to be analogous to this matrix. Discussed immediately below is body 61 shown in FIG. 15, an alternating flex embodiment.

The portion of the body containing element 76 corresponds to block 1 in the matrix. Similarly, the portion of the body containing element 77A corresponds to block 2 in the matrix. For this example, the correspondence between the element numbers from FIGS. 15A-15B and the matrix is shown below.

| Element # | Matrix # |
|---|---|
| 76 | 1 |
| 77A | 2 |
| 64 | 3 |
| 74 | 4 |
| 68 | 5 |
| 66 | 6 |
| 72 | 7 |
| 79 | 8 |
| 70 | 9 |

The table below provides a general description of the assembly sequence according to the above matrix.

| FIG. | TITLE | DESCRIPTION |
|---|---|---|
| 13 | Domed deflection | Dome to engage 1-2-3-4-5-6-7-8-9 |
| 14 | Domed deflection | Dome to engage 1-2-3-4-5-6-7-8-9 |
| 15 | Alternating flex | Dome to engage 2-4-5-6-7-8 then cup to engage 1-3-7-9 |
| 16 | Flex 2 directions | Engage 4-5-6 then 1-2-3-7-8-9 |
| 17 | Bridging fork pocket | Twist to engage 5 then 4-6 then 1-2-3-7-8-9, tangs overhang fork pocket for added rigidity |
| 18 | Multi-piece pallet | Four cover pieces engage separately |
| 19 | Living hinge | Similar to 15 |
| 20 | Hinge | Similar to 15 |
| 21 | Separate locking piece | Similar to 15 |
| 22 | Wall female flex assembly | Wall assembled by flexing one or more walls, female |
| 23 | Wall male flex assembly | Wall assembled by flexing one or more walls, male |
| 24 | Coverflex assembly | Similar to walls, but oil-can flex of cover |

Figure 14:
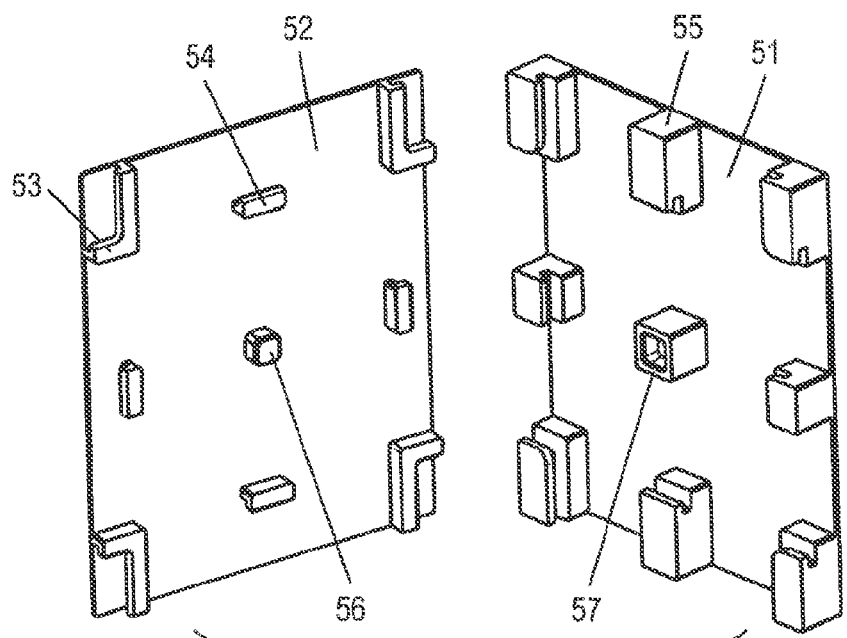
FIG. 14 illustrates an embodiment with a single flex using a dome deflection.

FIG. 14 depicts an exemplary Single Flex embodiment using a dome deflection. In the exemplary embodiment 50, bodies 51 and 52 are engaged together to form a pallet. Engagement is achieved by flexing one of the bodies 51, 52 in the form of a dome so that respective male and female members 52 and 53, 54 and 55, and 56 and 57 can be engaged and interlocked upon returning the flexed body 51 or 52 to an unflexed stated.

Figure 15B:
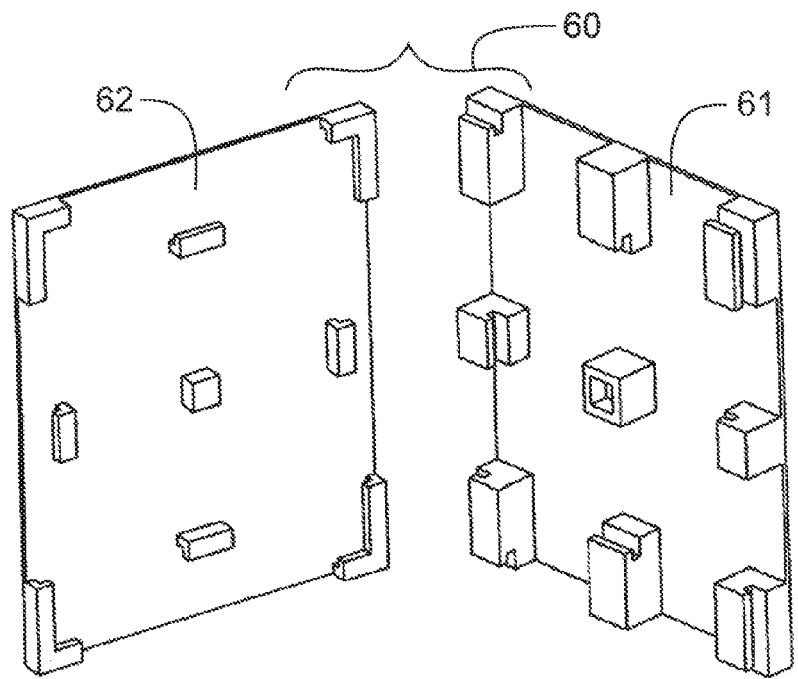
FIGS. 15A and 15B are first and second projection views of an embodiment using an alternating flex.
Figure 15A:
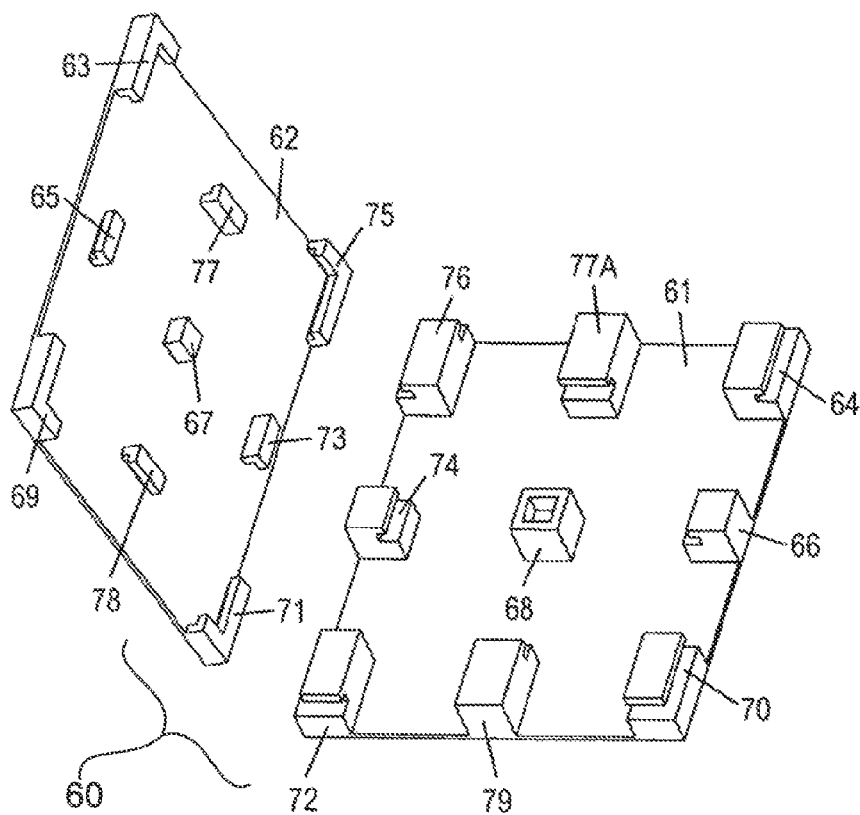

FIGS. 15A and 15B depict an exemplary Alternating Flex embodiment 60 including body members 61 and 62, which can be engaged to form a pallet. The body members 61 and 62 include respective male and female members to be engaged with each other and form an interlock. Engagement of the respective male and female members is achieved by doming at least one of the body 61 and 62 to engage male and female members 65 and 66, 78 and 79, 67 and 68, 77 and 77A, and 73 and 74 and then cupping at least one of the bodies 61 and 62 to engage the remaining male and respective female members 69 and 70, 75 and 76, 70 and 71, and 63 and 64.

Figure 16B:
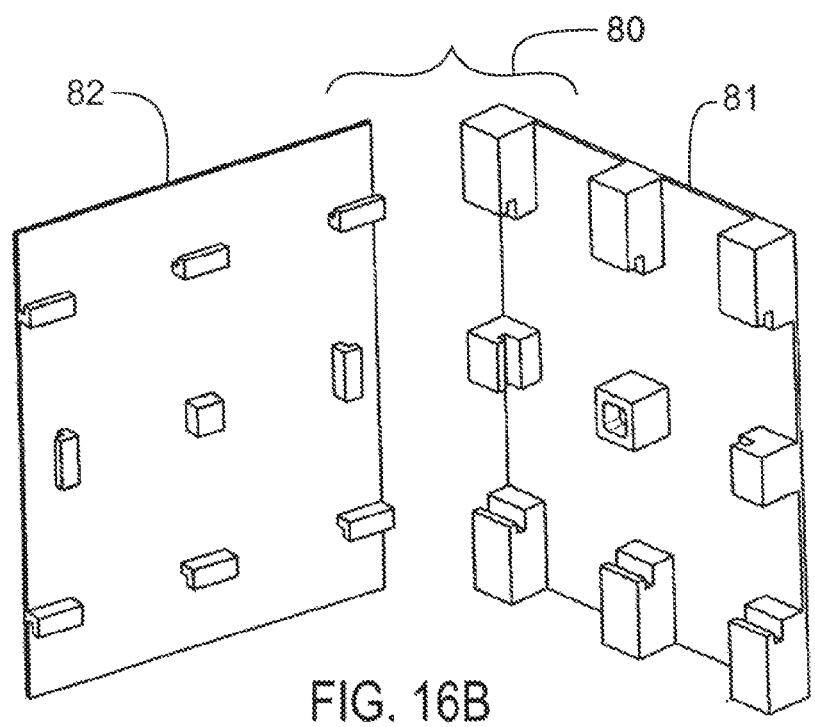
FIGS. 16A and 16B are first and second projection views of an embodiment using a 2 directional flex.
Figure 16A:
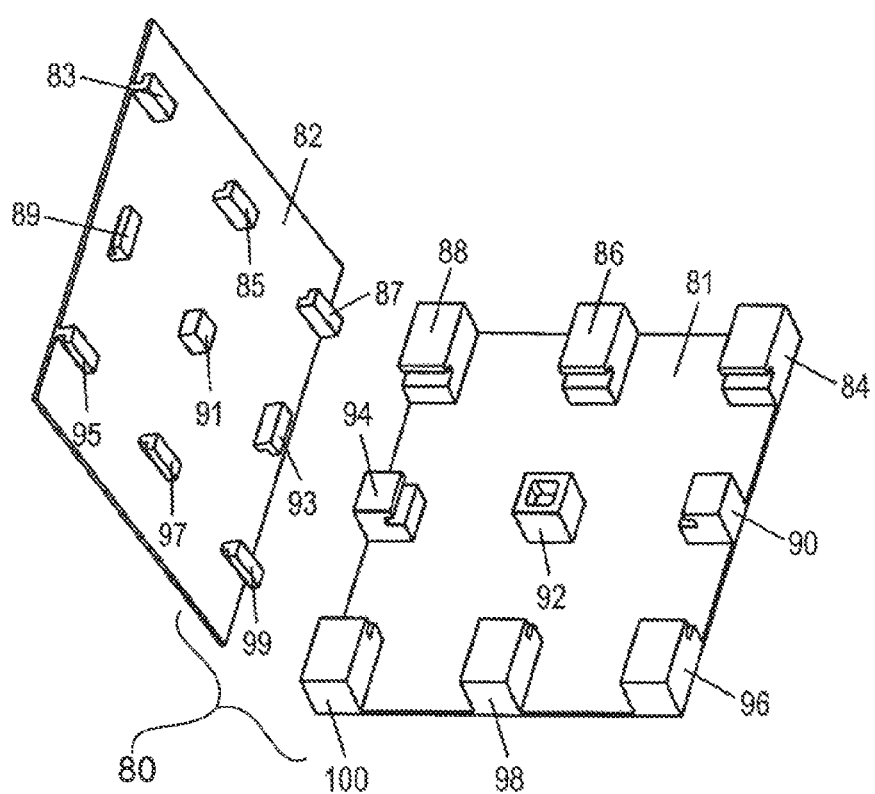

FIGS. 16A and 16B depict an exemplary Flex-in-2-directions embodiment 80 including respective pairs of male and female members to be engaged to form a pallet. In this embodiment, engagement of the male and female members is achieved by flexing at least one of the bodies 81 and 82 to engage male and respective female members 97 and 98, 91 and 92, and 85 and 86 and then flexing at least one of the bodies 81 and 82 in another direction to engage male and respective female elements 95 and 96, 89 and 90, 83 and 84, 99 and 100, 93 and 94, and 87 and 88.

Figure 17B:
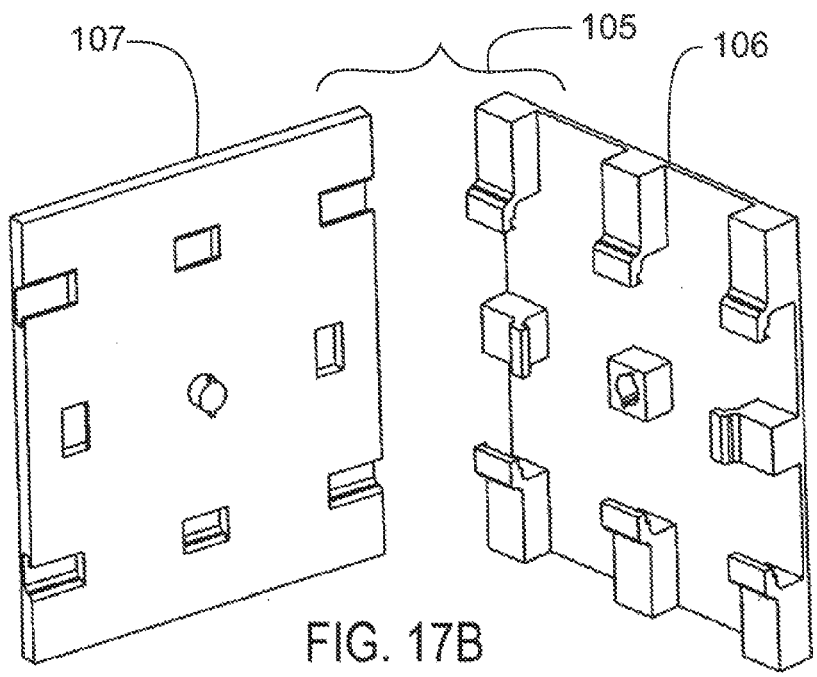
FIGS. 17A and 17B are first and second projection views of an embodiment with a bridging fork pocket.
Figure 17A:
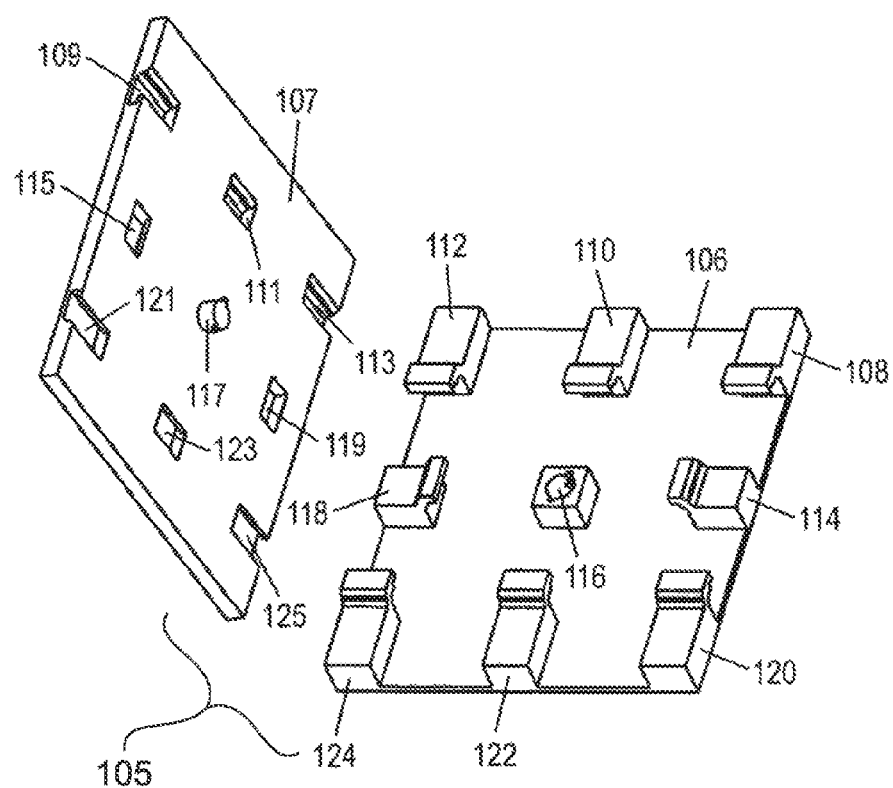

FIGS. 17A and 17B depict an exemplary Bridging Fork Pocket embodiment 105 including bodies 106 and 107 to be engaged to form a pallet. In this embodiment, the bodies 106 and 107 include respective male and female members to be engaged to connect bodies 106 and 107 to form a pallet. Engagement in this embodiment of the bodies 106 and 107 can be achieved by twisting to engage male and respective female members 117 and 116 and then respective male and female members 122 and 123 and 110 and 111 and then engaging elements 120 and 121, 114 and 115, 108 and 109 and elements 124 and 125, 118 and 119, and 112 and 113. Tangs in the embodiments overhang the fork pockets to provide added rigidity.

Flex locks can be located within each perimeter foot or outside of the feet and extending under the top deck of the pallet. In a preferred embodiment, locks are extended from each foot of the pallet toward the center of the pallet in the direction of rotation about the camber axis for assembly. This geometry, which can be anchored to the structure of the base and cantilevered out under the top deck thus bridging the fork pockets, substantially reduces the deflection of the pallet by reducing the effective span between columns. These features can be extended to reach neighboring columns to approach the structure of a one-piece pallet with continuity of the structure at the critical juncture between the top deck and the base columns.

Figure 18B:
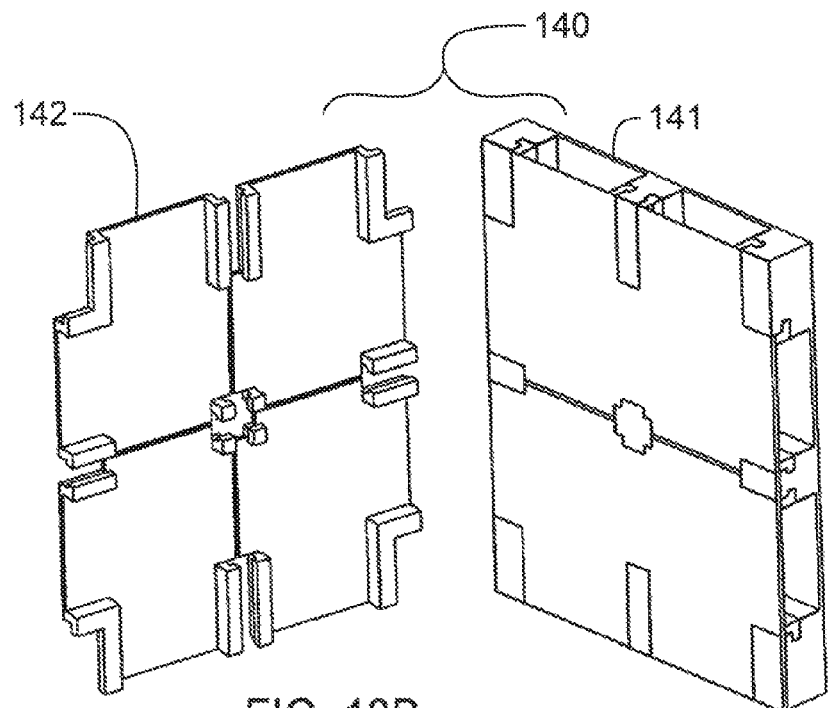
FIGS. 18A and 18B are first and second projection views of an embodiment with a multi-piece deck element.
Figure 18A:
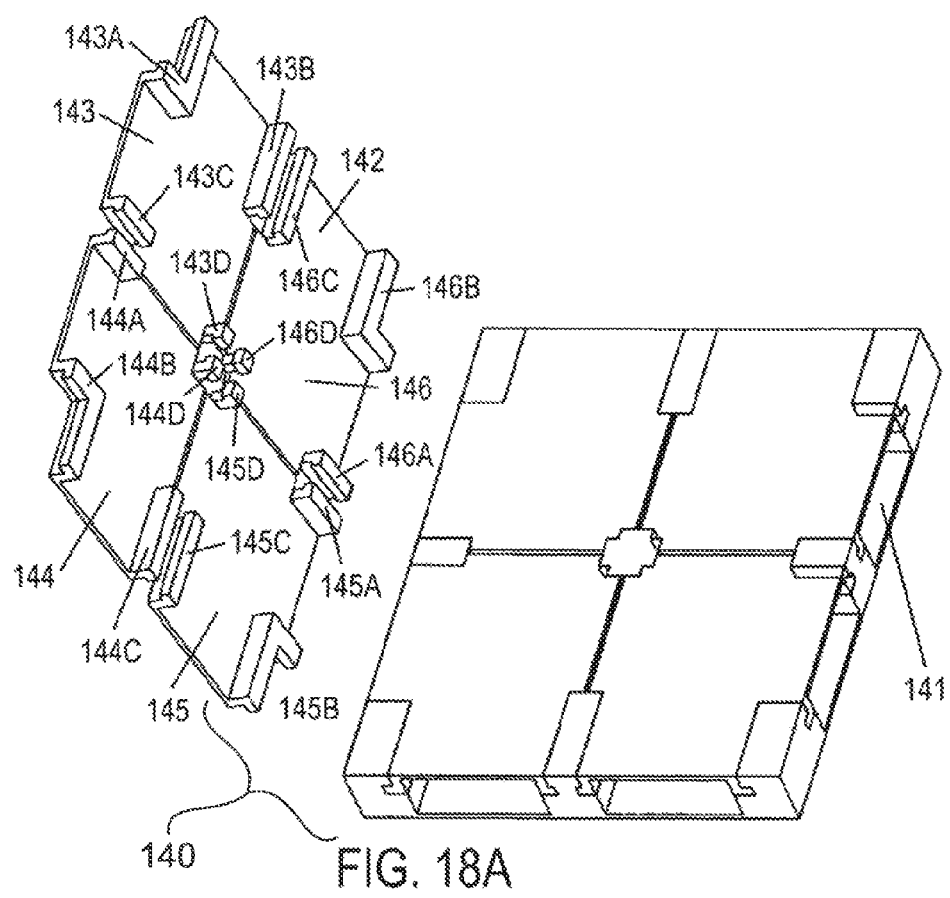

FIGS. 18A and 18B depict an exemplary Multi-piece Pallet embodiment, 140 including body members 141 and 142 that include respective male and female members to provide engagement of the bodies 141 and 142 to form a pallet. The multi-piece pallet embodiment is engaged using four cover pieces 143, 144, 145 and 146 that include various male members 143 A-D, 144 A-D, 145 A-D and 146 A-D to engage with respective female members. (Not separately numbered)

Figure 19B:
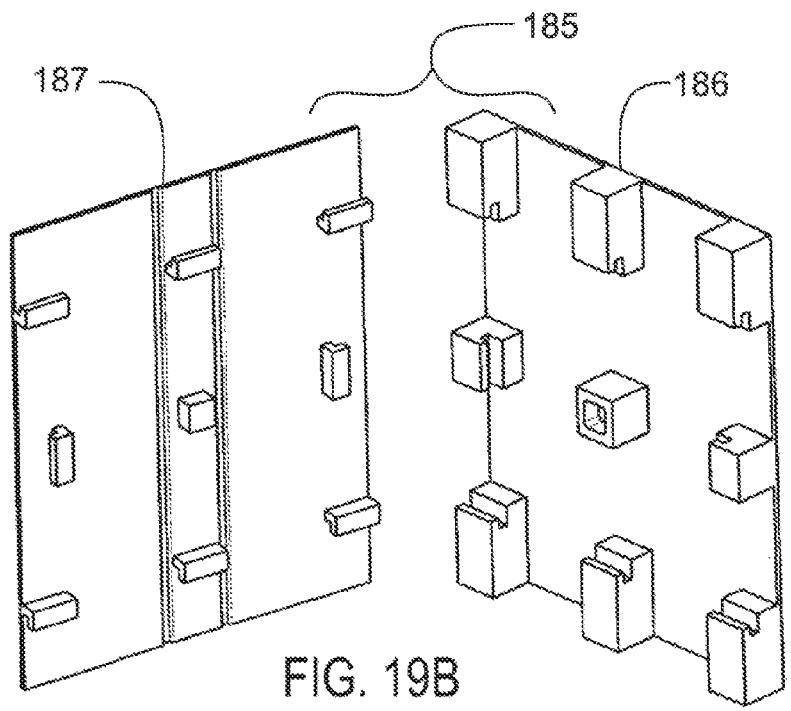
FIGS. 19A and 19B are first and second projection views of an embodiment with a deck having a living hinge.
Figure 19A:
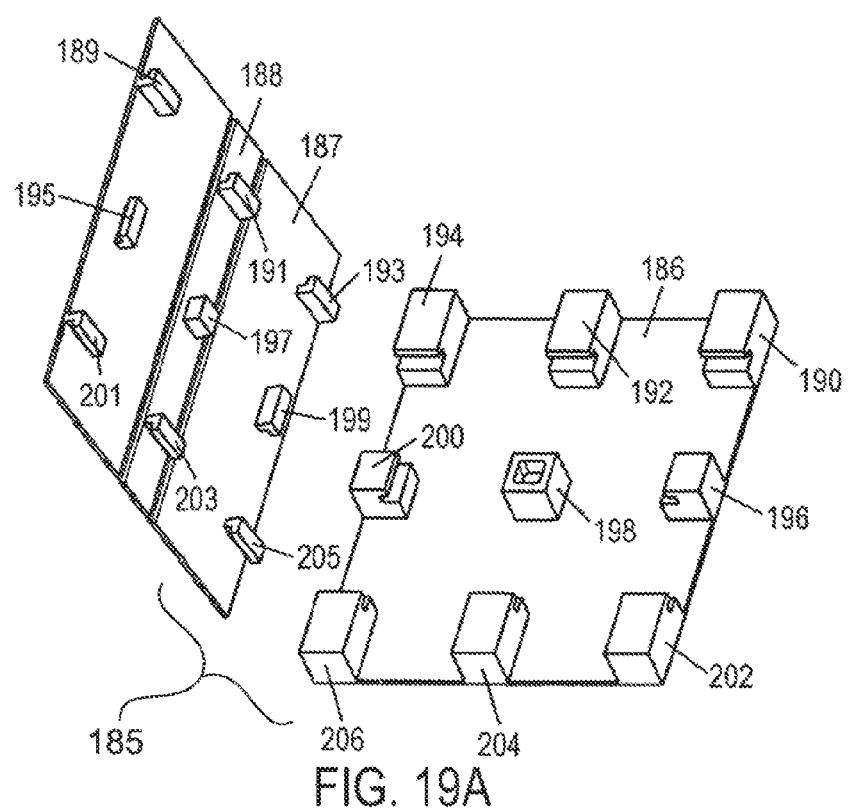

FIGS. 19A and 19B depict an exemplary Living Hinge embodiment 185 including bodies 186 and 187 with respective male and female members to provide engagement of the bodies 186 and 187 to form a pallet. The embodiment 185 also includes a living hinge 188 located on body 187 (although in other exemplary embodiments the living hinge may be on the other body member). The embodiment can be engaged in the same manner as the embodiment depicted in FIG. 15 and FIG. 15B by flexing in two directions but also using living hinge 188 so that male and female members 203 and 204, 197 and 198, and 191 and 192 are engaged and then flexing in another direction to engage male and respective female members 201 and 202, 195 and 196, 189 and 190, 193 and 194, 199 and 200, and 205 and 206.

Figure 20B:
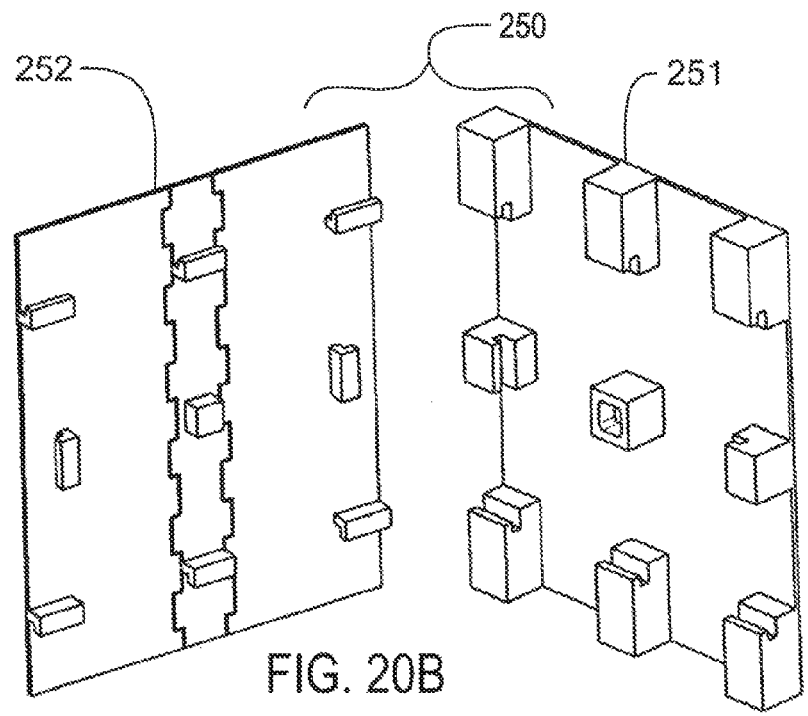
FIGS. 20A and 20B are first and second projection views of an embodiment with a deck having two pieces connected by a hinge.
Figure 20A:
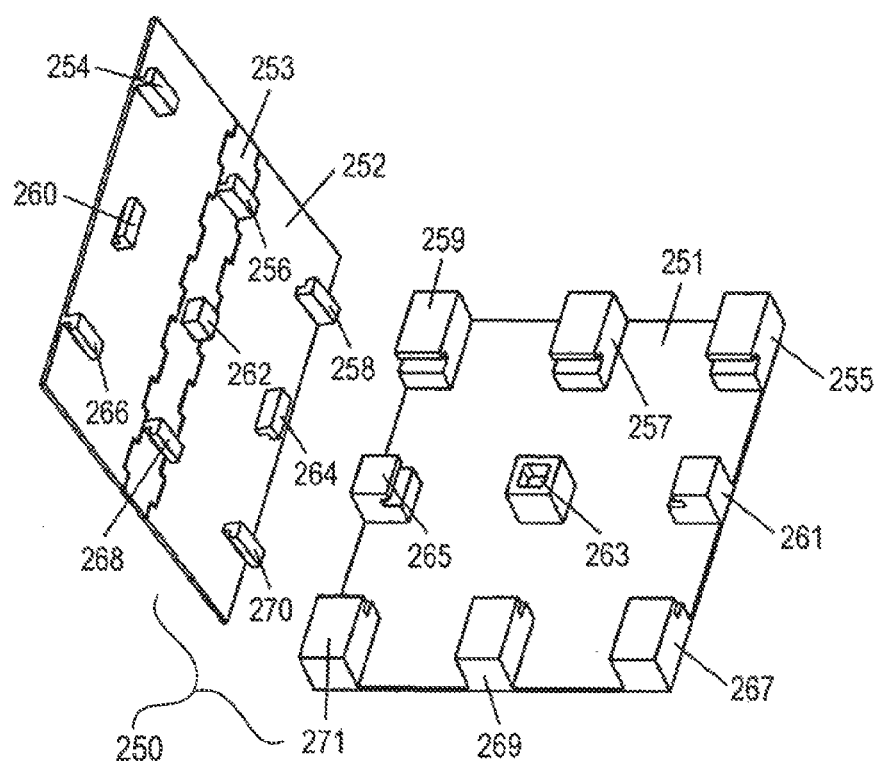

FIGS. 20A and 20B depict an exemplary Hinge embodiment of a pallet 250 including bodies 251 and 252 and hinge 253 located on body 252 (although in other exemplary embodiments the hinge may be positioned on the other body element 251). This embodiment, like the living hinge embodiment 185, can be engaged in the same manner as the exemplary embodiment depicted in FIGS. 15A and 15B by flexing in two directions and using hinge 253 so that male and respective female members 256 and 257, 262 and 263, and 268 and 269 are first engaged followed by engagement of the respective male and female members 266 and 267, 260 and 261, 254 and 255, 258 and 259, 264 and 265, and 270 and 271.

Figure 21B:
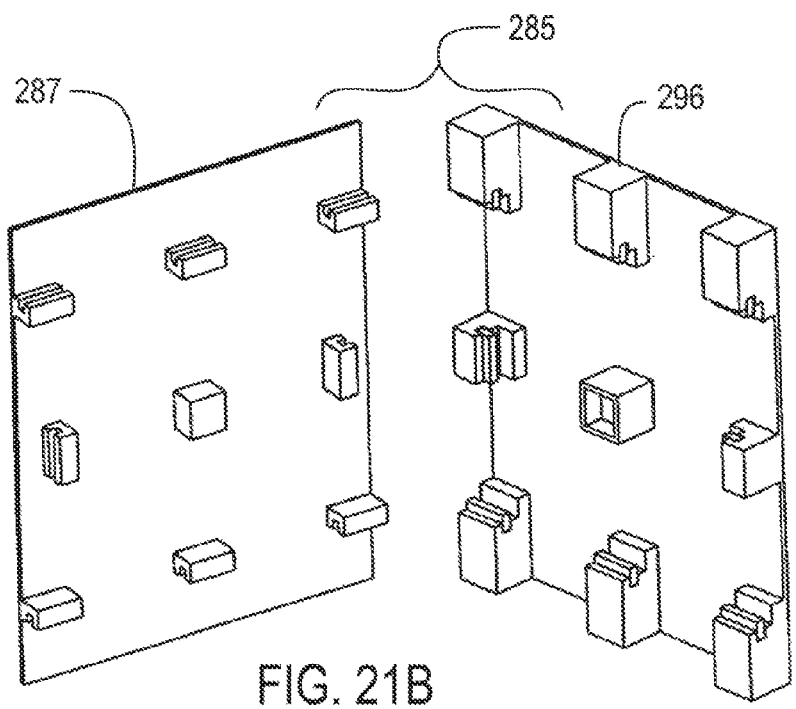
FIGS. 21A and 21B are first and second projection views of an embodiment with pallet having separate locking pieces.
Figure 21A:
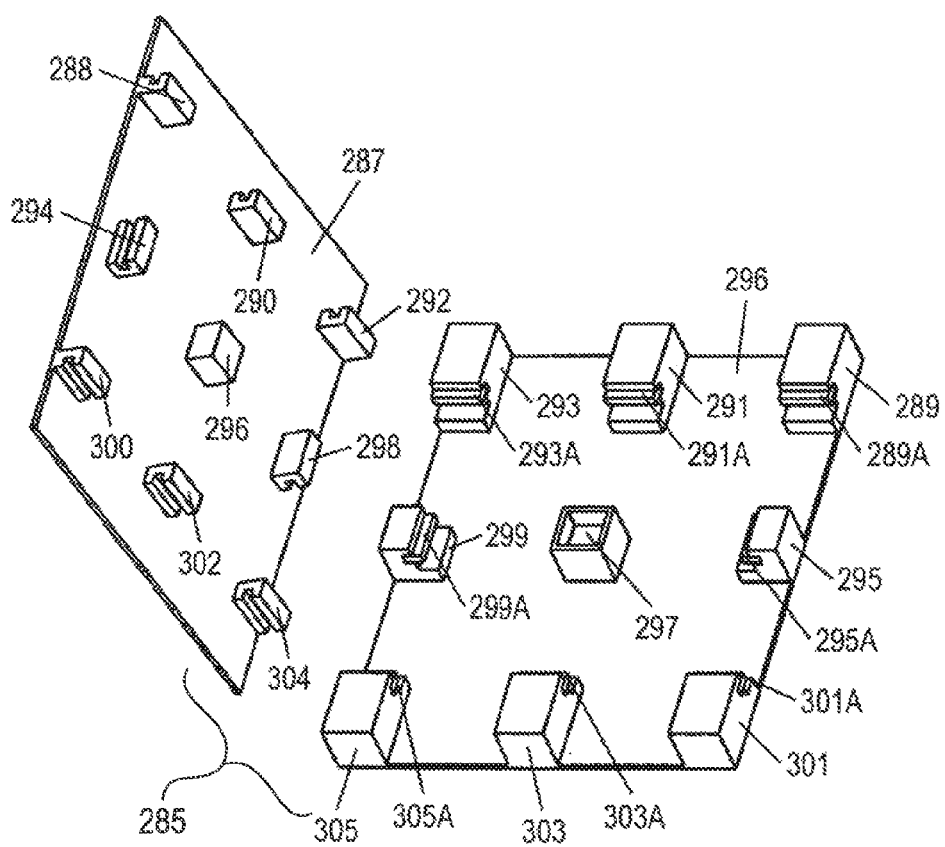

FIGS. 21A and 21B depict and exemplary Separate Locking Piece embodiment 285 including bodies 286 and 287 with respective male and female members and separate locking pieces to be used therein to connect or engage bodies 286 and 287 to form a pallet. In this embodiment 285 separate locking pieces are provided to provide engagement between the bodies. Engagement can be achieved in a manner similar to the embodiment depicted in FIGS. 15A and 15B by flexing at least one of the bodies 286 and 287 in different directions so that male and respective female elements 302 and 303, 303A and 296, 297 and 290, 291 and 291A can be engaged followed by engagement of elements 300 and 301, 301A and 294, 295 and 295A, 288 and 289, 289A and 304, 305 and 305A, 298 and 299, 299A and 292, and 293 and 293A.

Figure 22B:
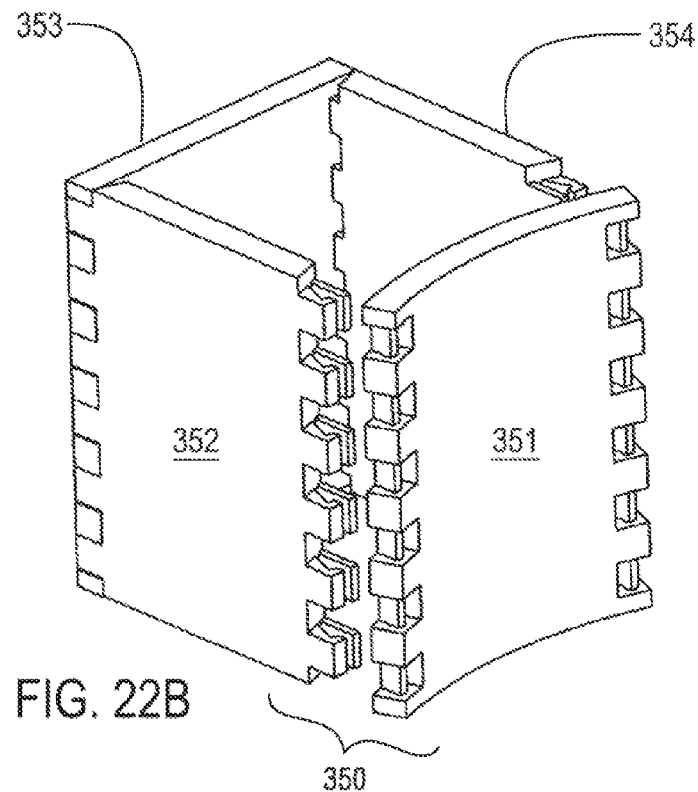
FIGS. 22A and 22B are first and second projection views of an embodiment with wall bodies having female lugs.
Figure 22A:
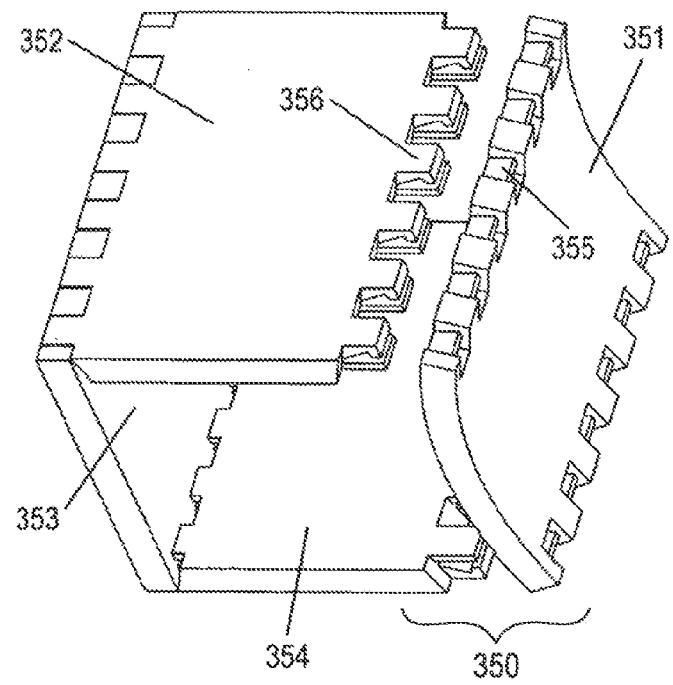

FIGS. 22A and 22B depict an exemplary Wall Female Flex Assembly 350 including four walls 351, 352, 353 and 354 wherein each wall has a set of male members 355 or female members 356 along an edge region so that a male member 355 can engage with a corresponding female member 356 to lock the wall members together at the corners. Accordingly, in exemplary embodiment 350, a wall member 351 can be engaged with a wall member 352 by flexing at least one of wall members 351 and 352 to allow a male member 355 to engage with a female member 356 so that the male member 355 and female member 356 are engaged and interlock when the at least one wall member 351 and 352 are unflexed.

FIGS. 23A and 23B depict an exemplary Wall Flex assembly 385 in an assembled state, the assembly including walls 386, 387, 388 and 389 wherein the walls include a plurality of female engagement members 390 and corresponding male engagement members 391. As shown in FIGS. 23C-23E, the wall assembly can be assembled by flexing at least one of the wall elements such as, for example, wall element 386 to permit engagement between female engagement members 390 and male engagement members 391 on wall member 387 and 389 so that engagement between the wall members can be achieved and maintained upon returning wall member 386 to an unflexed state.

FIG. 24A depicts an exemplary Cover in an assembled state, with Flex Assembly 400 having a cylindrically shaped body 402 with a round cover 401. As shown in FIGS. 24B-24C, engagement of the cover 401 with body 402 can be achieved by obtaining engagement between male interlock members 404 on the top opening of the body 402 with female engagement members 403 located along the edge of the cover 401. The cover 401 can be flexed and/or cambered and/or the body 402 can be flexed and/or cambered so that engagement between the male engagement members 404 can be achieved with female engagement members 403 so that when the cover 401 and/or body 402 are returned to an unflexed state, the interlock between the male engagement member 404 and female engagement member 403 is maintained.

FIG. 25A is a top view of and FIG. 25B is a cross sectional view of an embodiment of a pallet with various exemplary interlocking features 502 along with snap locks 504 connecting a base 520 to a deck 525. FIG. 26A is a top view of and FIG. 26B is a cross sectional view of an exemplary embodiment of a bayonet locks 602a-602d connecting base 520 to deck 525.

While exemplary articles and methods have been described in detail with reference to specific embodiments thereof, it will be apparent to those skilled in the art that various changes and modifications can be made, and equivalents employed without departing from the scope of the pending claims.

Each patent, patent application, publication, text and literature article/report cited or indicated herein is hereby expressly incorporated by reference in its entirety.

While the application describes various embodiments in terms of exemplary, specific and preferred embodiments, the skilled artisan will appreciate that various modifications, substitutions, omissions, and changes may be made without departing from the spirit thereof. Accordingly, it is intended that the scope of the present application be limited solely by the scope of the following claims, including equivalents thereof

What is claimed is:

1. A pallet comprising:
   (a) a first body having a plurality of first projections extending therefrom, at least two of the plurality of first projections each including a corresponding at least one first interlocking member, each first interlocking member being rigid; and
   (b) a second body having:
      (i) a plurality of second interlocking members located within the second body for engaging a respective one of the first interlocking members, each second interlocking member being rigid, or
      (ii) a plurality of second projections extending therefrom, at least two of the plurality of second projections each including a corresponding at least one of the second interlocking members for engaging a respective one of the first interlocking members, each of the second interlocking members being rigid, each first interlocking member being positioned to engage with a corresponding one of the second interlocking members when the first and second bodies are interlocked;
   wherein the first body and the second body are configured such that, when the first body and the second body they are separate from one another and when the first body and the second body are each in an unflexed state, the second interlocking members are configured to interfere with the first interlocking members to prevent interlocking of the first and second bodies; and
   wherein at least one of the first body and the second body has a flexibility that permits a flexed state to be attained in which at least one of (1) a distal portion of the second body including the second interlocking members is tilted outward and (2) a distal portion of the first body including the at least two first projections is tilted inward so that the corresponding first interlocking members are configured to engage the corresponding second interlocking members and remain engaged when the unflexed state is re-attained after the flexed state is attained, and
   a first of the first and second bodies being a base of the pallet and a second of the first and second bodies being a deck of the pallet.

2. The pallet of claim 1, wherein at least one of the first and second bodies comprises at least one projection centrally located on the at least one of the first and second bodies.

3. The pallet of claim 1, wherein each of the first body and the second body comprises at least one projection centrally located thereon.

4. The pallet of claim 1 wherein, when the pallet is in an assembled state, at least one of the first and second bodies is planar.

5. The pallet of claim 1 wherein, when the pallet is in an assembled state, each of the first and second bodies is planar.

6. The pallet of claim 5, wherein each of the first planar body and the second planar body has a flexibility permitting tilting outward a distal portion of the second body including at least one of the second interlocking members and tilting inward a distal portion of the first body including the at least two of the plurality of first projections so that each of the at least one first interlocking member engages a corresponding at least one of the plurality of second interlocking members.

7. The pallet of claim 1 wherein, when the pallet is in an assembled state, one of the first and second bodies is planar and the other body is cambered.

8. The pallet of claim 1 wherein, when the pallet is in an assembled state, one of the first and second bodies is planar and the other body is domed.

9. The pallet of claim 1 wherein, when the pallet is in an assembled state, each of the first and second bodies is cambered.

10. The pallet of claim 1, wherein at least one of the first body and the second body has a flexibility permitting each of the at least one first interlocking member to engage a corresponding one of the plurality of second interlocking members.

11. The pallet of claim 1, wherein each of the first body and the second body is planar and has a flexibility permitting each of at least two of the plurality of first interlocking members to engage a corresponding one of the plurality of corresponding second interlocking members.

12. The pallet of claim 1, wherein the second interlocking members are angled.

13. The pallet of claim 1, wherein at least one of the first body and the second body comprises a hinge.

14. The pallet of claim 1, wherein at least one of the first body and the second body comprises a plurality of pieces.

15. The pallet of claim 14, wherein the plurality of pieces are connected by a hinge.

16. The pallet of claim 1, wherein the interlock allows the first and second bodies to be disconnected without damaging either the first or second interlocking members.

17. The apparatus of claim 1, wherein the first body and the second body are configured such that, when the first body and the second body are separate from one another and when the first body and the second body are each in an unflexed state, the second interlocking members are configured to interfere with first interlocking members to prevent interlocking of the first interlocking members and the second interlocking members upon any linear translation of the first and second bodies.

18. The apparatus of claim 1 wherein, when the first body and the second body are each in the unflexed state, the first body and the second body are non-interlockable.

19. A method of interlocking bodies having interlocks to form a pallet, the method comprising:
   (a) providing:
   (i) a first body having a plurality of first projections extending therefrom, each of at least two of the plurality of first projections including a corresponding at least one first interlocking member, the first interlocking members being rigid; and
   (ii) a second body having a plurality of second projections extending therefrom, each of at least two of the plurality of second projections including a corresponding at least one second interlocking member for engaging a respective one of the first interlocking members, the second interlocking members being rigid; wherein:
   each of the at least two of the plurality of second projections is positioned to engage with a corresponding one of the at least two of the plurality of first projections when the first and second bodies are interlocked, and at least one of the first body and the second body has a flexibility permitting tilting at least one of tilting outward a distal portion of at least one of the at least two second projections each including one of the second interlocking members and tilting inward a distal portion of at least one of the at least two first projections including one of the first interlocking members so that each of the at least two of the first interlocking members engages a corresponding one of the plurality of second interlocking members,
(b) flexing a bendable portion of at least one of the first body and the second body by applying a force against the body to flex the body, wherein at least one of the first body and the second body tilts outward a distal portion of the at least two of the second projections and tilts inward a distal portion of the at least two of the first projections,
(c) applying a sufficient amount of the force to allow the first interlocking members on the at least of the first projections to engage corresponding ones of the at least two of the first interlocking members on the at least two second projections,
(d) removing the force and allowing the first body and the second body to return to an unflexed state wherein the first and second bodies are interlocked, wherein one of the first and second bodies is a base of the pallet and the other is a deck of the pallet.

20. The method of claim 19, wherein the flexing comprises cambering the first body and the second body by placing the force against the bodies to flex the bodies and wherein the first body and the second body tilt outward a distal portion of the at least two of the second projections and tilt inward a distal portion of the at least two of the plurality of first projection including the first interlocking members, wherein the amount of the force applied allows each of the at least one of the plurality of first interlocking members to engage a corresponding one of the plurality of corresponding second interlocking members.

21. The method of claim 19, wherein first and second bodies are interlocked by sliding the first and second bodies horizontally with respect to each other to achieve engagement of the at least two of the plurality of first interlocking members with a corresponding one of the at least two of the second interlocking members.

22. A pallet comprising:
a) at least a first body and a second body, wherein at least one of the first body and the second body is flexible to allow at least one first interlocking element extending from the first body to engage with at least one second interlocking element extending from the second body, the at least one first interlocking element and the at least one second interlocking element being rigid;
b) wherein, the first body and the second body are configured such that, when separated from one another and when the first body and the second body are each in an unflexed state, the at least one first interlocking elements and the at least one second interlocking elements are positioned to interfere with one another to prevent engagement of the first interlocking elements with the second interlocking elements;
c) wherein, when the at least one of the first body and the second body is in a flexed state, the at least one first interlocking element and the at least one second interlocking element is in a rotated position relative to the unflexed state such that the at least one first interlocking element and the at least one second interlocking element is disposed inward or outward relative to the other of the at least one first interlocking element and the at least one second interlocking element to allow engagement of the at least one first interlocking element with the at least one second interlocking element;
d) wherein the at least one first interlocking element and the at least one second interlocking element are configured such that an interlock formed between the at least one first interlocking element and the at least one second interlocking element is maintained when the at least one of the bodies, after being flexed, is returned to an unflexed state; and
e) wherein, when the at least one first interlocking element and the at least one second interlocking element are engaged, the first and second bodies form at least a portion of the pallet.

23. A method of interlocking bodies having interlocks to form a pallet, the method comprising:
(a) providing:
i) a first body and a second body, wherein at least one of the first body and the second body are flexible to allow at least one first interlocking element extending from the first body to engage with at least one respective second interlocking element extending from the second body, the at least one first interlocking element and the at least one second interlocking element being rigid;
ii) wherein the at least one of the first interlocking element and the at least one of the second interlocking element rotates inward or outward relative to the other of the at least one of the first interlocking elements and the at least one of the second interlocking elements to allow engagement of the at least one of the first interlocking elements with the at least one of the second interlocking elements;
iii) wherein an interlock formed between the at least one first interlocking element and the at least one second interlocking element is maintained when at least one of the bodies, after being flexed, is returned to an unflexed state; and
iv) wherein, when the at least one first and second interlocking element are engaged, the first and second bodies form at least a portion of the pallet,
(b) flexing a bendable portion of at least one of the first body and the second body by applying a force against the body to flex the body, wherein at least one of the first and second bodies tilt outward a distal portion of the second body including the at least one of the second interlocking element and tilts inward a distal portion of the first body including the at least one of the first interlocking element,
(c) applying a sufficient amount of the force to allow the at least one of the first interlocking element to engage a corresponding one of the at least one of the second interlocking elements,
(d) removing the force and allowing at least one of the first body and the second body to return to an unflexed state wherein the first and second bodies are interlocked, wherein one of the first and second bodies is a base of the pallet and the other is a deck of the pallet.

24. The method of claim 23, wherein the flexing comprises cambering the first body and the second body by placing the force against the bodies to flex the bodies and wherein the first body and the second body tilt outward a distal portion of the second body including the at least one second interlocking element and tilt inward a distal portion of the first body including the at least one first interlocking element, wherein the amount of the force applied allows the at least one of the first interlocking element to engage a corresponding at least one of the second interlocking elements on opposing sides of the first and second bodies.

25. The method of claim 23, wherein the first body and the second body are interlocked by sliding the first and second bodies horizontally with respect to each other to achieve engagement of the at least one first interlocking element with the at least one second interlocking element.

\* \* \* \* \*